United States Patent
Crumley et al.

(10) Patent No.: US 11,722,536 B2
(45) Date of Patent: Aug. 8, 2023

(54) APPARATUSES, COMPUTER-IMPLEMENTED METHODS, AND COMPUTER PROGRAM PRODUCTS FOR MANAGING A SHARED DYNAMIC COLLABORATIVE PRESENTATION PROGRESSION INTERFACE IN ASSOCIATION WITH AN AUDIO-VIDEO CONFERENCING INTERFACE SERVICE

(71) Applicants: ATLASSIAN PTY LTD., Sydney (AU); ATLASSIAN, INC., San Francisco, CA (US)

(72) Inventors: Ryan Crumley, Austin, TX (US); Matthew McDaniel, Austin, TX (US); Shiuan-chin Chang, Sunnyvale, CA (US); Dylan Soechting, Austin, TX (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/646,076

(22) Filed: Dec. 27, 2021

(65) Prior Publication Data
US 2023/0208895 A1  Jun. 29, 2023

(51) Int. Cl.
*H04L 65/401* (2022.01)
*G06F 3/04812* (2022.01)
(Continued)

(52) U.S. Cl.
CPC ...... *H04L 65/4015* (2013.01); *G06F 3/04812* (2013.01); *G06F 3/04842* (2013.01);
(Continued)

(58) Field of Classification Search
CPC ............... H04L 65/4015; H04L 65/403; H04L 65/1089; G06F 3/04812; G06F 3/04842; H04M 2250/62; H04M 2250/66
See application file for complete search history.

(56) References Cited

U.S. PATENT DOCUMENTS 7,714,878 B2  5/2010  Gabay et al.
8,311,950 B1  11/2012  Kunal et al.
(Continued)

*Primary Examiner* — Michael A Keller
(74) *Attorney, Agent, or Firm* — Alston & Bird LLP

(57) ABSTRACT

Various embodiments of the present disclosure provide for generating, updating, and/or otherwise managing a shared dynamic collaborative presentation progression interface in association with an audio-video conferencing interface service. An example embodiment is configured to monitor an active audio-video conference presentation that is configured for display to participating client devices by the audio-video conference interface service, generate a shared dynamic collaborative presentation progression interface, transmit the shared dynamic collaborative presentation progression interface to the plurality of participating client devices, receive an initiate topic object sequence set event from at least one participating client device of the participating client devices, identify a first topic object of the topic object sequence set as an active topic object, and update the shared dynamic collaborative presentation progression interface render an active visual emphasis element of the first topic object.

31 Claims, 17 Drawing Sheets

(51) Int. Cl.
 *G06F 3/04842* (2022.01)
 *H04L 65/403* (2022.01)
 *H04L 65/1089* (2022.01)

(52) U.S. Cl.
 CPC ........ *H04L 65/403* (2013.01); *H04L 65/1089* (2013.01); *H04M 2250/62* (2013.01); *H04M 2250/66* (2013.01)

(56) References Cited

U.S. PATENT DOCUMENTS

| | | | |
|---|---|---|---|
| 9,454,789 | B2 | 9/2016 | Lord |
| 9,648,275 | B2 | 5/2017 | Tamura et al. |
| 10,067,987 | B1 * | 9/2018 | Khanna ................. H04L 67/303 |
| 10,397,519 | B1 * | 8/2019 | Kurisaki-Sagberg ........................ H04N 7/147 |
| 10,397,645 | B2 * | 8/2019 | Veeramani ....... H04N 21/42203 |
| 10,404,943 | B1 | 9/2019 | Fieldman |
| 10,708,673 | B2 | 7/2020 | Bi et al. |
| 10,979,481 | B2 | 4/2021 | Jayaweera |
| 11,023,690 | B2 | 6/2021 | Yoshioka et al. |
| 11,030,813 | B2 | 6/2021 | Hare et al. |
| 11,082,464 | B1 * | 8/2021 | Warner ............... H04L 65/1089 |
| 11,146,601 | B1 * | 10/2021 | Silverstein ............. H04L 67/10 |
| 11,424,945 | B1 | 8/2022 | Yang et al. |
| 2009/0171973 | A1 | 7/2009 | Gagne et al. |
| 2009/0300520 | A1 | 12/2009 | Ashutosh et al. |
| 2015/0016661 | A1 | 1/2015 | Lord |
| 2016/0117624 | A1 | 4/2016 | Flores et al. |
| 2016/0165056 | A1 | 6/2016 | Bargetzi et al. |
| 2016/0205349 | A1 | 7/2016 | Cheng et al. |
| 2016/0338120 | A1 | 11/2016 | Boyle |
| 2017/0006162 | A1 | 1/2017 | Bargetzi et al. |
| 2017/0243171 | A1 * | 8/2017 | Bellamy ............. H04L 12/1822 |
| 2017/0359393 | A1 | 12/2017 | Rajagopal et al. |
| 2018/0337968 | A1 * | 11/2018 | Faulkner ............... H04L 51/046 |
| 2019/0132265 | A1 * | 5/2019 | Nowak-Przygodzki ..................... G10L 15/22 |
| 2019/0251342 | A1 | 8/2019 | Zhao et al. |
| 2020/0349230 | A1 | 11/2020 | Yoshioka et al. |
| 2021/0044645 | A1 | 2/2021 | Jayaweera |
| 2021/0367801 | A1 | 11/2021 | Rajamani et al. |

* cited by examiner

APPARATUSES, COMPUTER-IMPLEMENTED METHODS, AND COMPUTER PROGRAM PRODUCTS FOR MANAGING A SHARED DYNAMIC COLLABORATIVE PRESENTATION PROGRESSION INTERFACE IN ASSOCIATION WITH AN AUDIO-VIDEO CONFERENCING INTERFACE SERVICE

BACKGROUND

Applicant has identified a number of deficiencies and problems associated with efficiently identifying and effectively disseminating information regarding one or more agenda elements in an audio-video conference presentation, among a plurality of users in existing systems that provide multi-party virtual meeting environments (e.g., audio/video conferencing). Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved apparatuses, methods, systems, and computer program products configured for generating and updating a shared dynamic collaborative presentation progression interface in association with an active audio-video conference presentation provided by an audio-video conferencing interface service. In accordance with one exemplary embodiment of the present disclosure, an apparatus is configured to manage a shared dynamic collaborative presentation progression interface in association with an audio-video conferencing interface service, the apparatus comprising at least one processor and at least one memory, the at least one memory having computer-coded instructions therein, wherein the computer-coded instructions are configured to, in execution with at least one processor, cause the apparatus to: monitor an active audio-video conference presentation that is configured for rendering to respective displays of a plurality of participating client devices by the audio-video conferencing interface service; generate a shared dynamic collaborative presentation progression interface, wherein the shared dynamic collaborative presentation progression interface is associated with a topic object sequence set and wherein the shared dynamic collaborative presentation progression interface is configured for rendering to the respective displays of the plurality of participating client devices in association with the active audio-video conference presentation; transmit the shared dynamic collaborative presentation progression interface to the plurality of participating client devices; receive an initiate topic object sequence set event from at least one participating client device of the plurality of participating client devices; in response to receiving the initiate topic object sequence set event, identify a first topic object of the topic object sequence set as an active topic object; and update the shared dynamic collaborative presentation progression interface to cause rendering of at least an active visual emphasis element in association with a visual representation of the first topic object.

In some embodiments, the updated shared dynamic collaborative presentation progression interface further comprises a visual representation of an elapsed time object displayed in association with the first topic object. In still further embodiments, the elapsed time object corresponds to a timer activated by the apparatus in association with identifying the first topic object as the active topic object. In some embodiments, the shared dynamic collaborative presentation progression interface further comprises a topic object progression interface component.

In some embodiments, the computer-coded instructions are further configured to, in execution with the at least one processor, cause the apparatus to: receive a topic object progression event from at least one participating client device of the plurality of participating client devices; de-identify the first topic object as the active topic object; identify a second topic object in the topic object sequence set as the active topic object; generate a transition topic object sequence instructions set based on the topic object progression event; and output the transition topic object sequence instructions set to the plurality of participating client devices for updating the shared dynamic collaborative presentation progression interface, wherein updating the shared dynamic collaborative presentation progression interface comprises causing: stopping of the rendering of the active visual emphasis element in association with the visual representation of the first topic object; and rendering of the active visual emphasis element in association with the visual representation of the second topic object.

In some embodiments, the de-identifying of the first topic object as the active topic object comprises: dissociating an active topic object identifier from the first topic object; associating the first topic object with a completed topic object identifier; and storing the elapsed time object coinciding with the receipt of the topic object progression event in association with the completed first topic object.

In some embodiments, the computer-coded instructions are further configured to, in execution with the at least one processor, cause the apparatus to: in association with causing stopping of the rendering of the active visual emphasis element with respect to the visual representation of the first topic object, cause display of a completion indicator in association with the visual representation of the first topic object.

In some embodiments, the computer-coded instructions are further configured to, in execution with the at least one processor, cause the apparatus to: in association with causing stopping of the rendering of the active visual emphasis element with respect to the visual representation of the first topic object, cause display of an annotation summary in association with the visual representation of the first topic object. In still further embodiments, the annotation summary comprises a summary listing of content captured in association with the first topic object during the period of time the first topic object was identified as the active topic object.

In some embodiments, the identifying of the second topic object in the topic object sequence set as the active topic object comprises associating the second topic object with an active topic object identifier.

In some embodiments, the first participating user identifier is associated with the first topic object and a second participating user identifier is associated with the second topic object and wherein the computer-coded instructions are further configured to, in execution with the at least one processor, cause the apparatus to: display a visual representation of the first participating user identifier in association with the visual representation of the first topic object; and display a visual representation of the second participating user identifier in association with the visual representation of the second topic object. In still further embodiments, the computer-coded instructions are further configured to, in execution with the at least one processor, cause the apparatus to: in response to identifying the first topic object of the topic object sequence set as the active topic object, transmit a display upcoming presenter notification event to the participating client device associated with the second participating user identifier.

In some embodiments, a plurality of participating user identifiers are associated with the first topic object and wherein the computer-coded instructions are further configured to, in execution with the at least one processor, cause the apparatus to: in response to receiving an identify random presentation order event, identify a first participating user identifier of the plurality of participating user identifiers associated with the first topic object; cause display of a visual representation of the first participating user identifier in association with the visual representation of the first topic object; determine a presenting order of the remaining participating user identifiers associated with the first topic object; and cause display of visual representations of each of the remaining participating user identifiers in the determined order in association with an upcoming presenter interface element in the visual representation of the first topic object.

In some embodiments, a portion of the visual representation of the first topic object comprises a selectable link, the selectable link corresponding to a resource object identified in association with the first topic object.

In some embodiments, the active audio-video conference presentation is associated with a presentation identifier and the topic object sequence set is associated with the presentation identifier.

In some embodiments, the computer-coded instructions are further configured to, in execution with the at least one processor, cause the apparatus to: receive a display collaborative conference presentation interface request, wherein the display collaborative conference presentation interface request comprises a participating user identifier; query a repository for agenda objects associated with the user identifier; cause display of a collaborative conference presentation interface to the participating client device associated with the participating user identifier in association with the active audio-video conference presentation, wherein the collaborative conference presentation interface comprises a rendered listing of agenda objects returned by the query and wherein each of the agenda objects is configured to be selectable; identify an agenda object selection request, wherein the agenda object selection request comprises an agenda object identifier; and retrieve the topic object sequence set based on the agenda object identifier from the repository.

In some embodiments, the shared dynamic collaborative presentation progression interface comprises a visual representation of the topic object sequence set. In still further embodiments, each of the topic objects of the topic object sequence set are associated with a respective target time and the computer-coded instructions are further configured to, in execution with the at least one processor, cause the apparatus to: display a visual representation of the respective target time in association with each topic object that is not associated with a completed topic object identifier or an active topic object identifier. In still further embodiments, the computer-coded instructions are further configured to, in execution with the at least one processor, cause the apparatus to: determine an elapsed time for each completed topic object, wherein a completed topic object is a topic object associated with a completed topic object identifier; display a visual representation of the respective elapsed time in association with each completed topic object; determine a visual emphasis element for each completed topic object based at least in part on the respective target time, wherein each visual emphasis element employs a contextually relevant coloring scheme to visually indicate a comparison of the elapsed time for the completed topic object to the respective target time of each completed topic object; and apply the determined visual emphasis elements to the visual representations of the respective elapsed time in association with each completed topic object.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
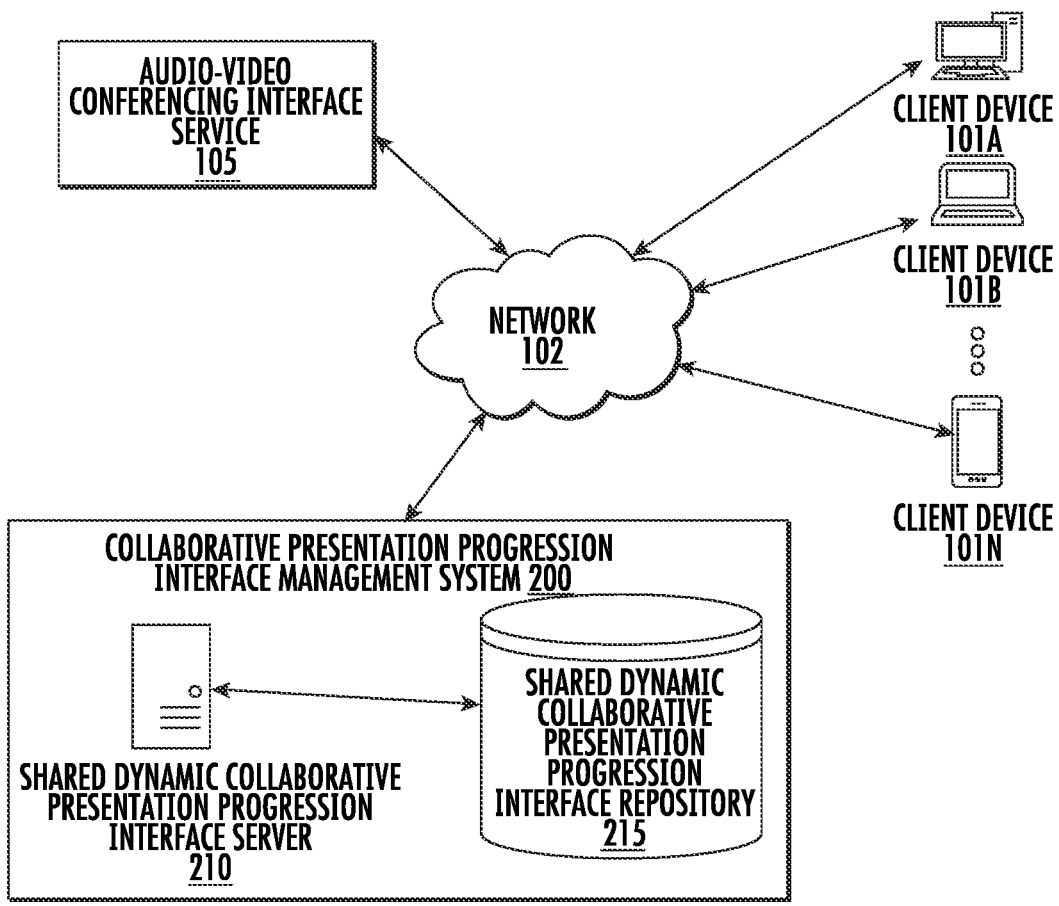
Figure 2:
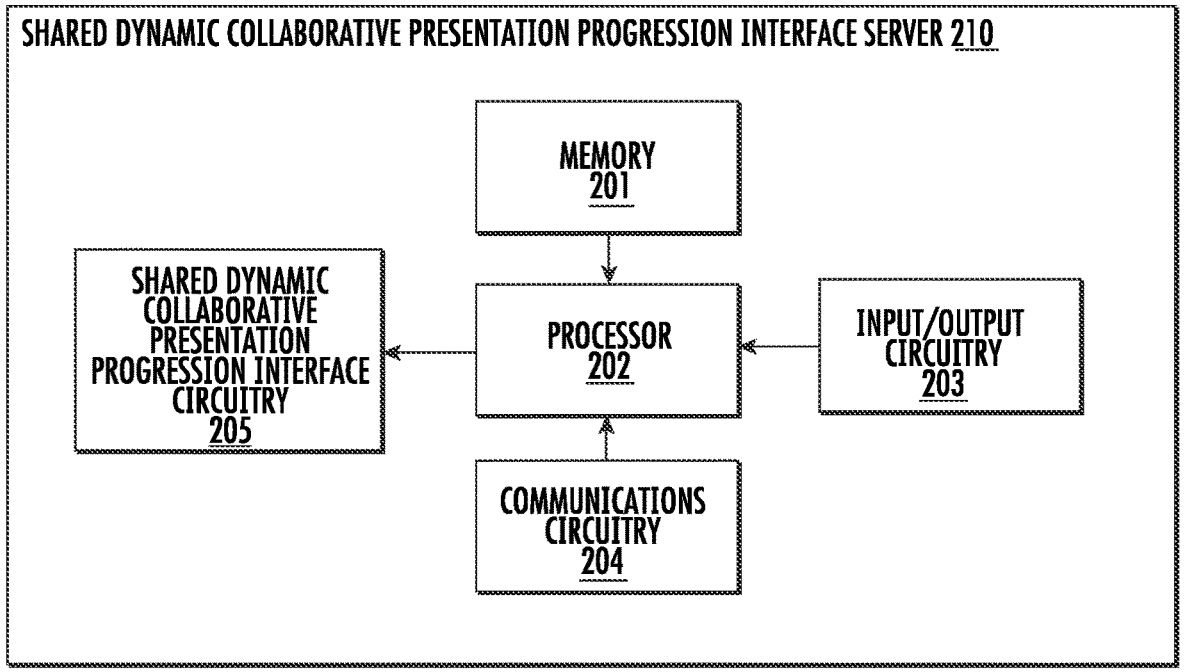
Figure 3:
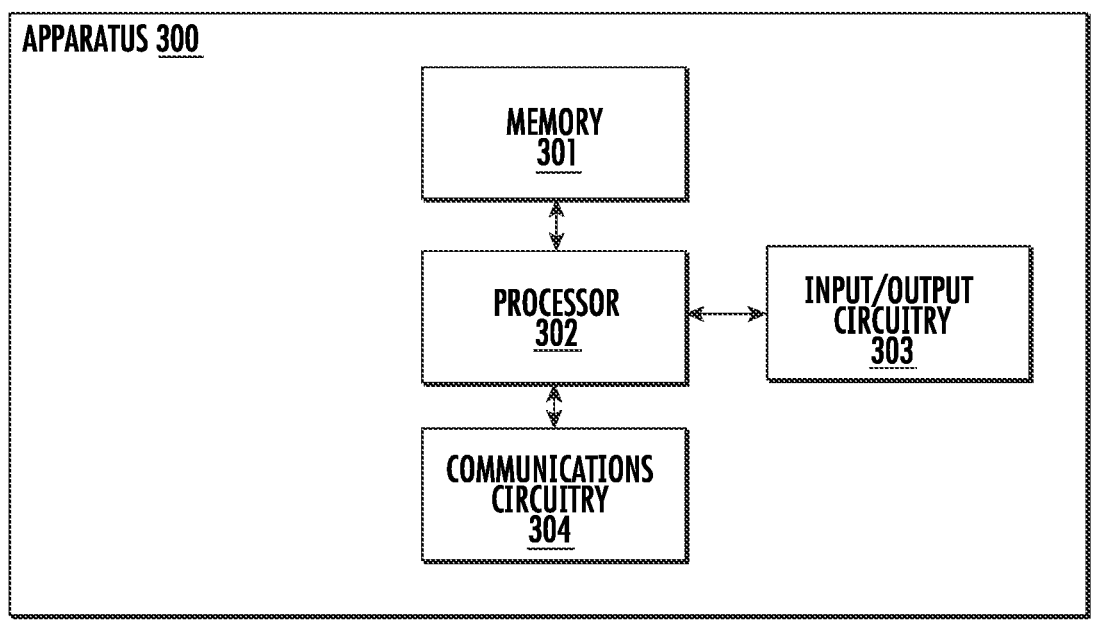
Figure 4A:
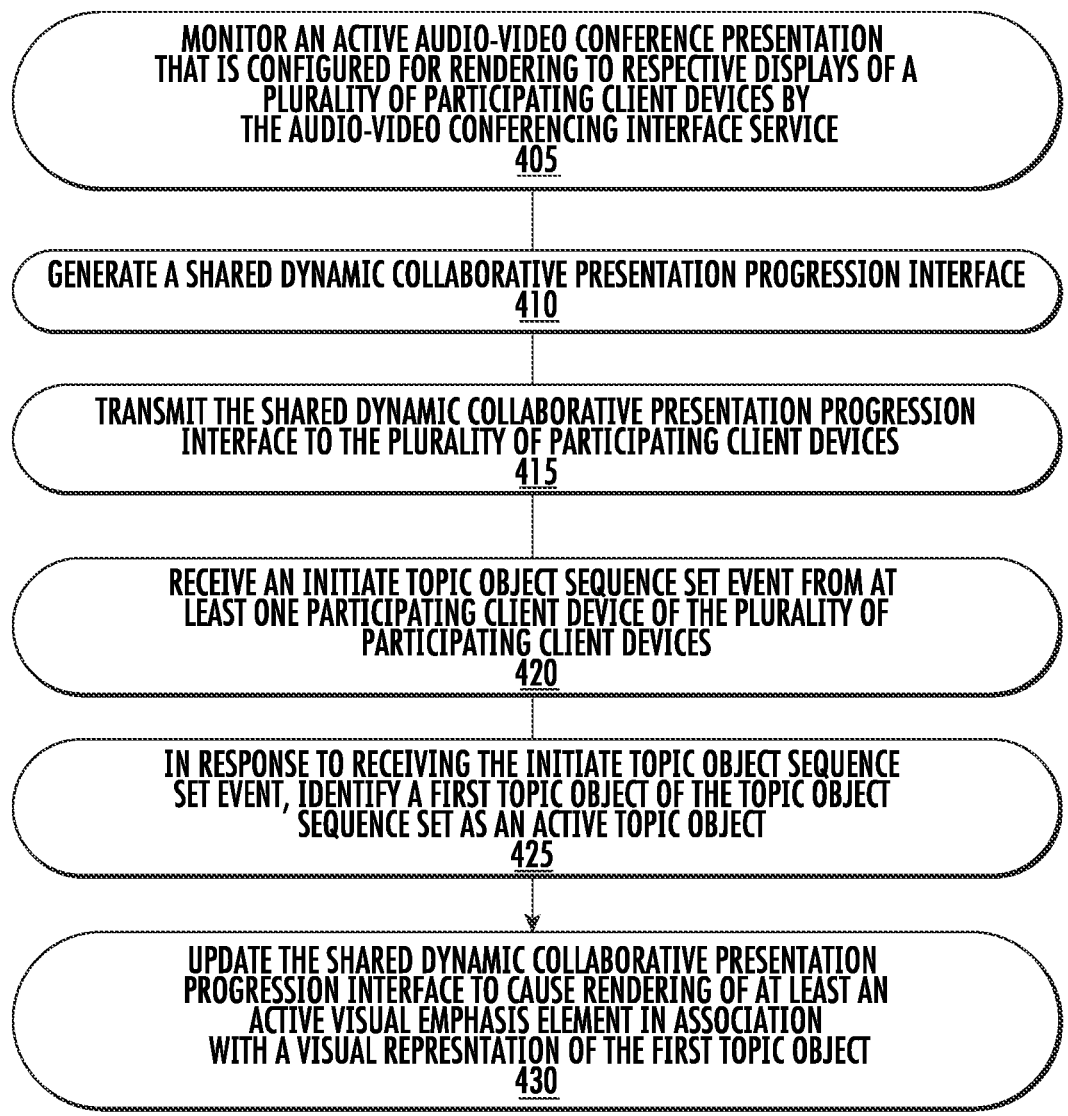
Figure 4B:
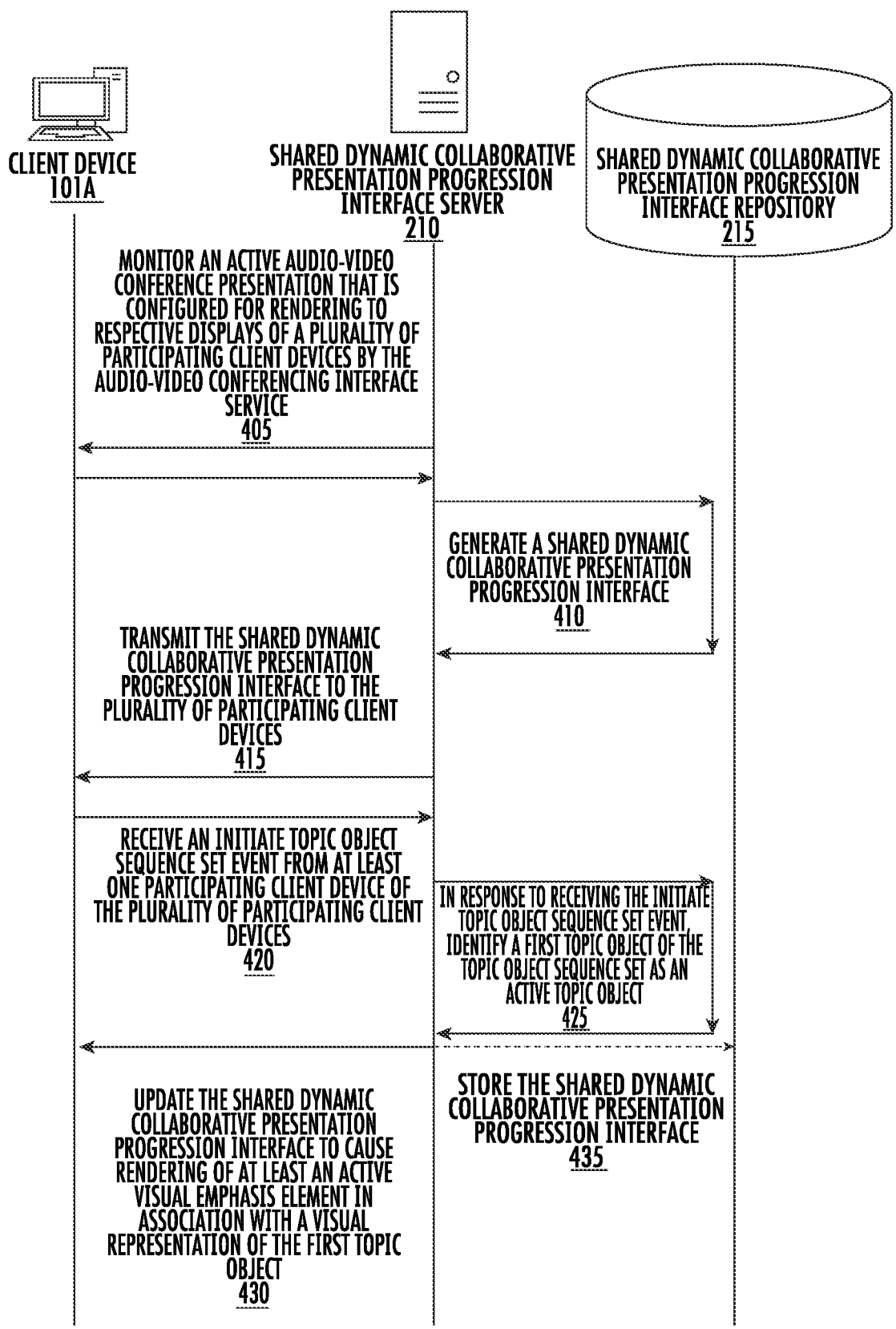
Figure 5:
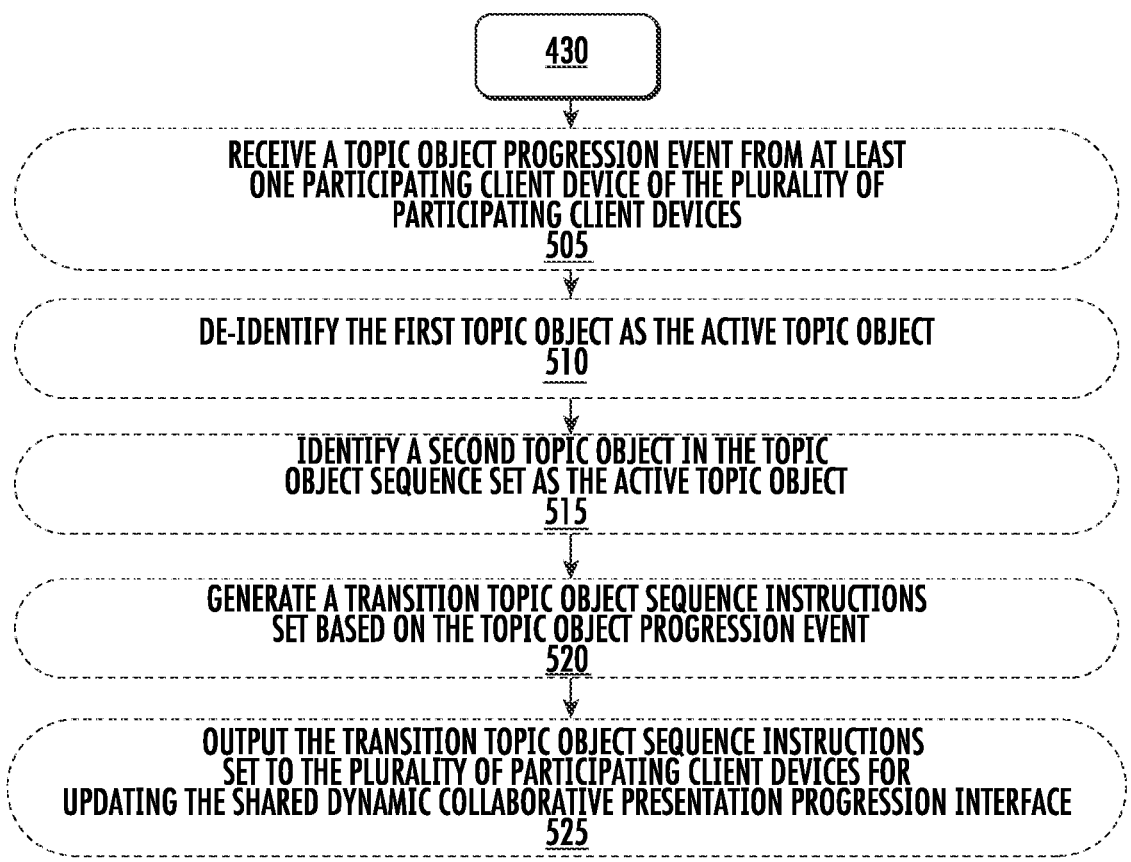
Figure 6:
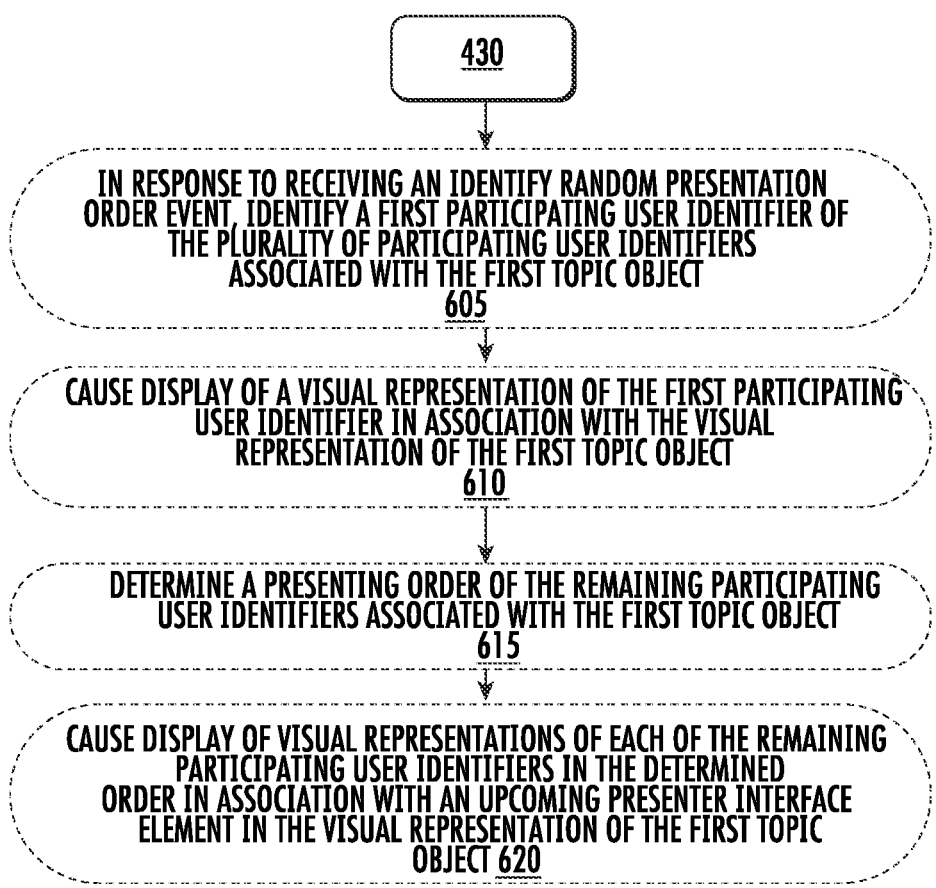
Figure 7:
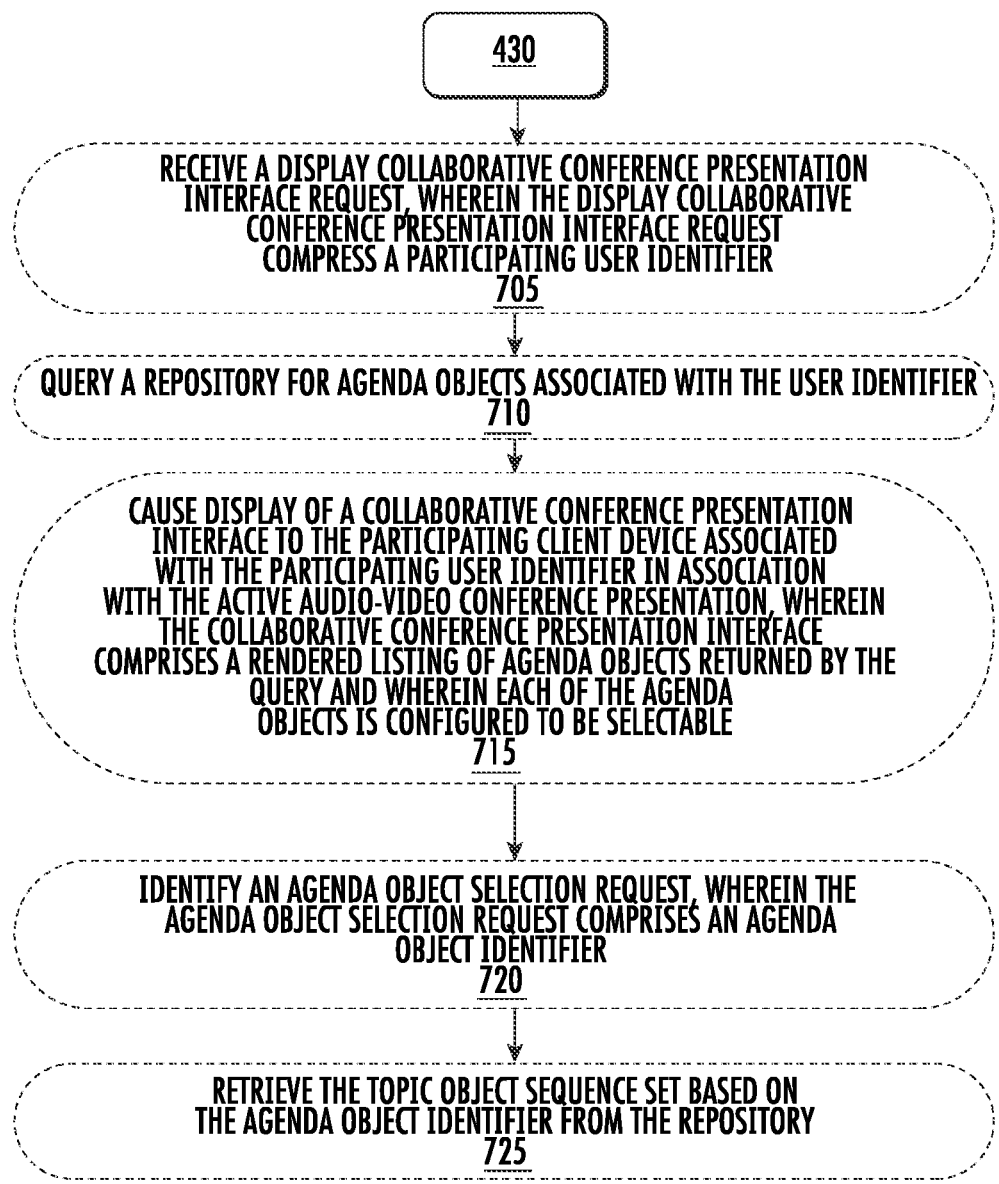
Figure 8:
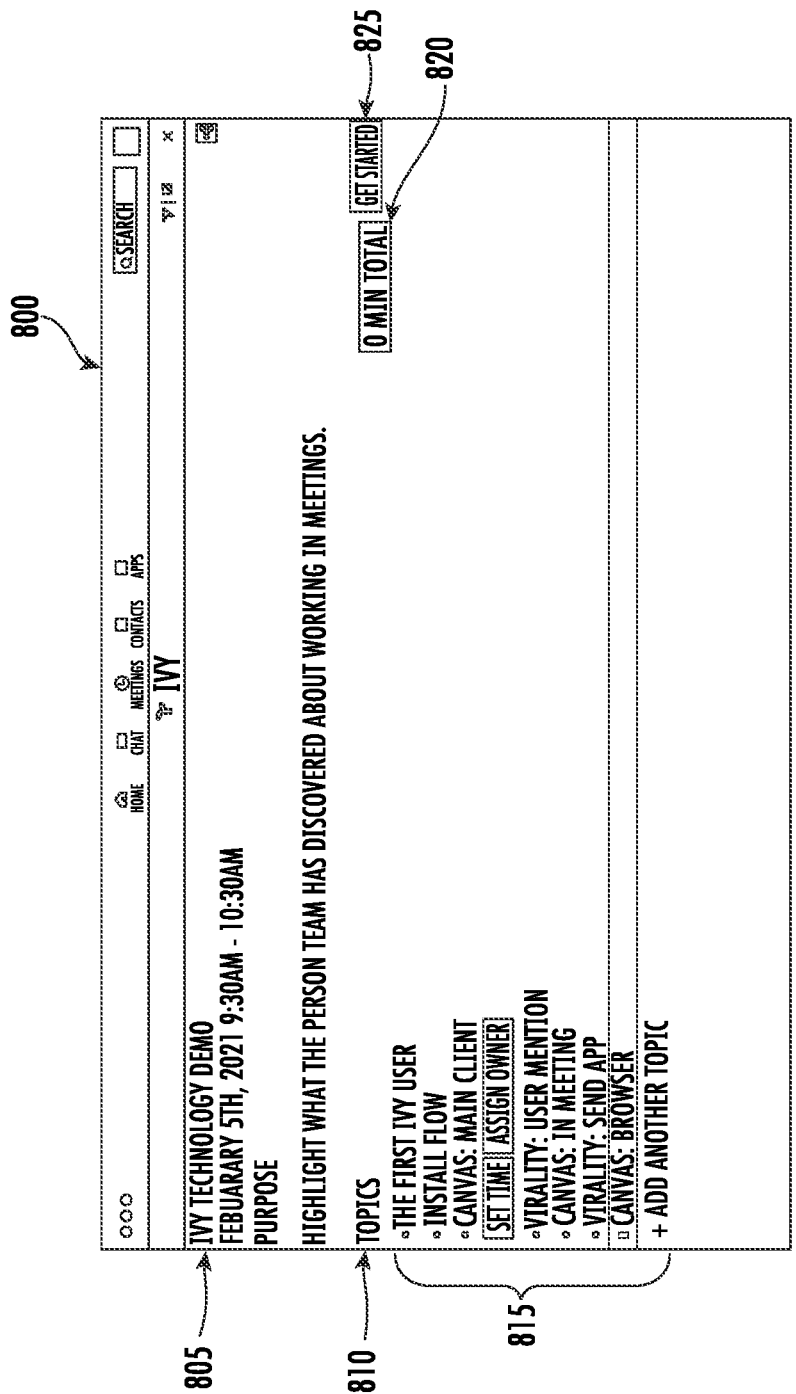
Figure 9:
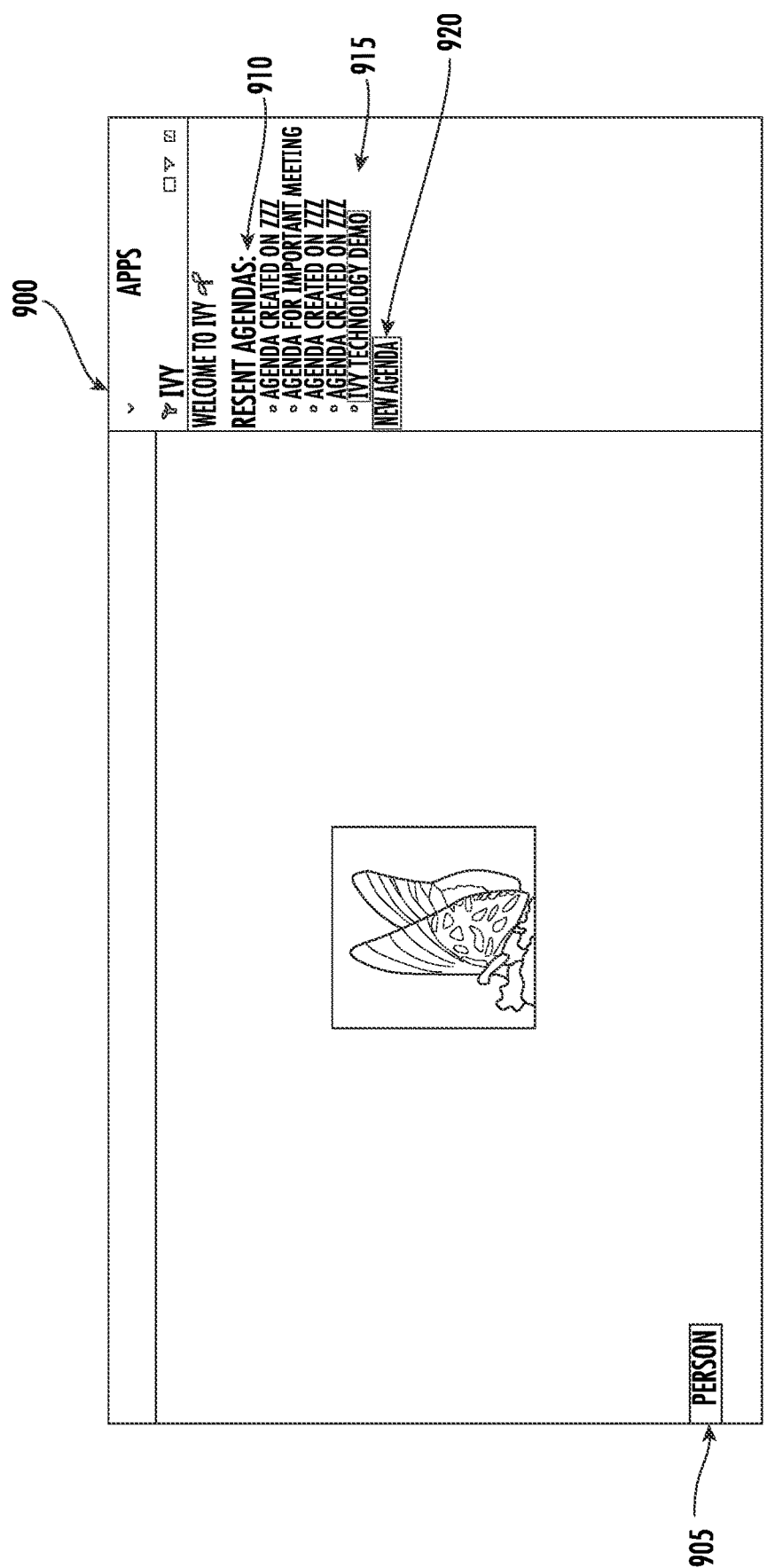
Figure 10:
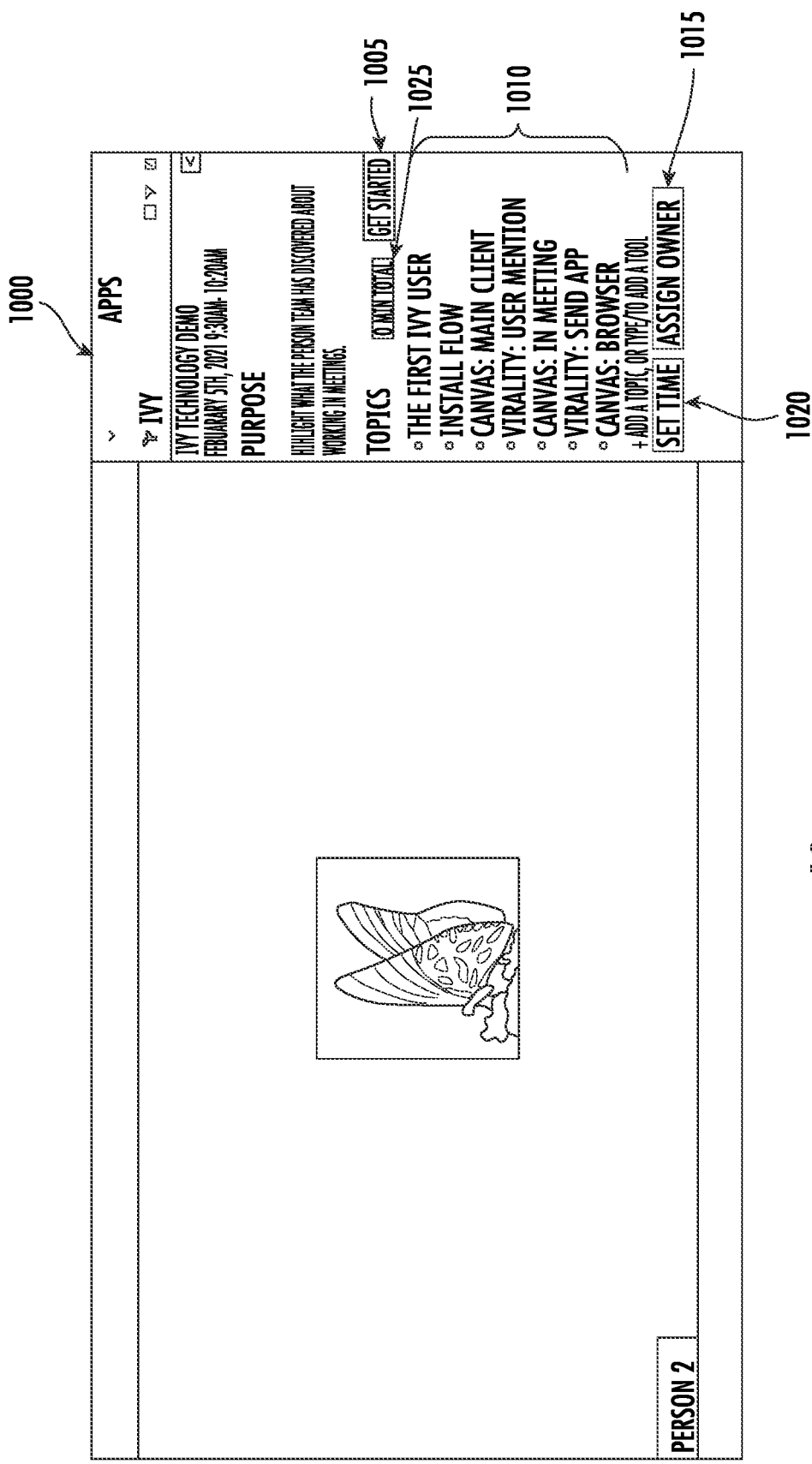
Figure 11:
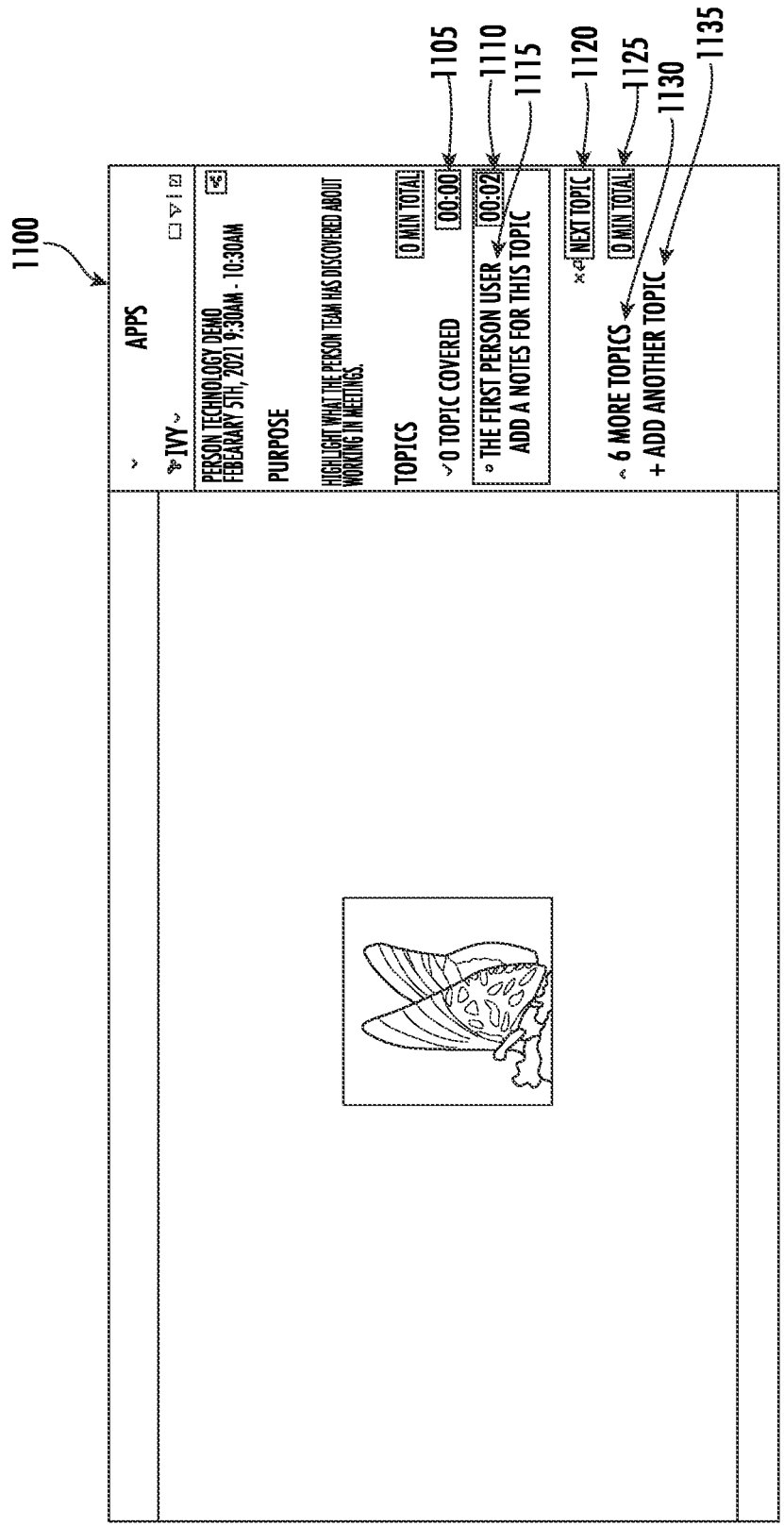
Figure 12:
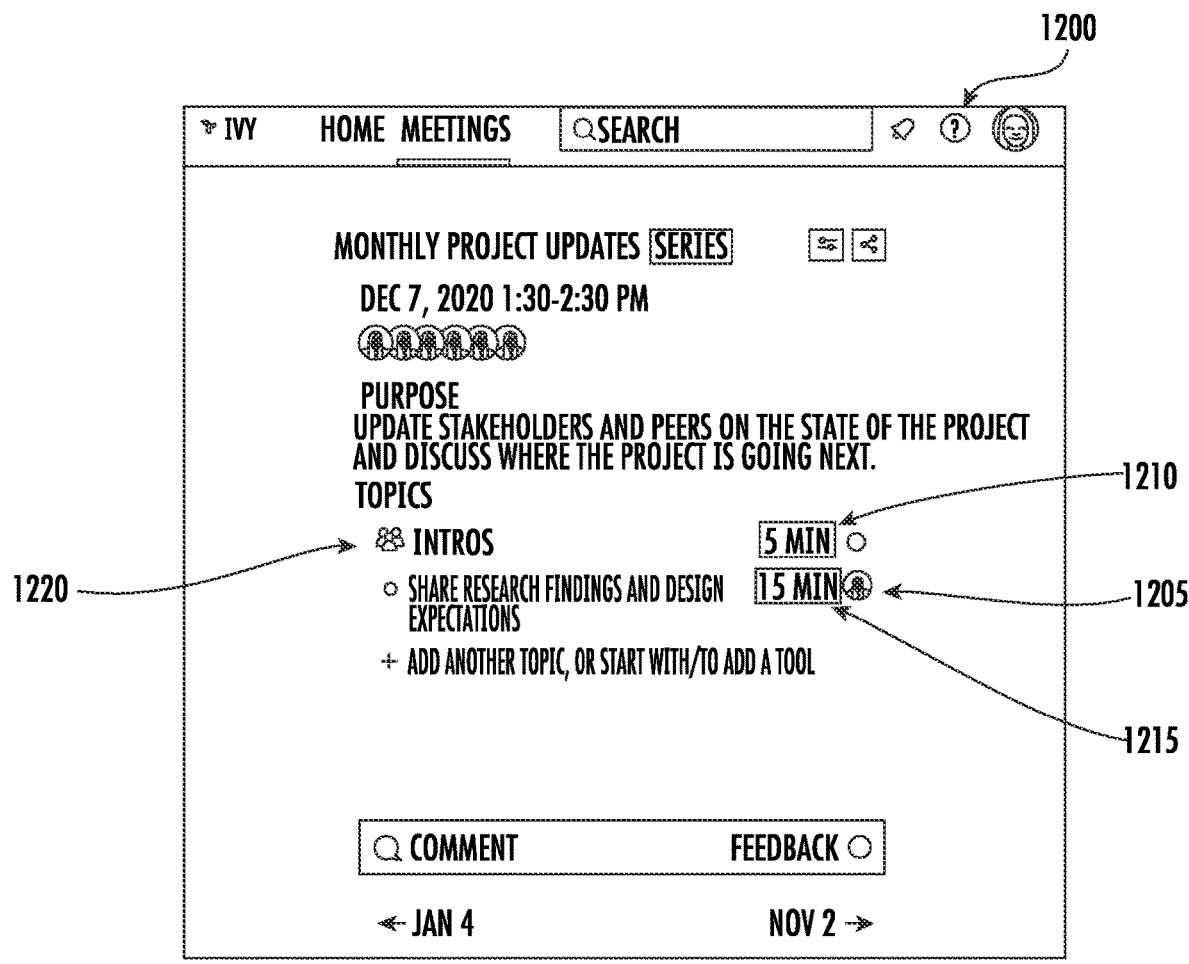
Figure 13:
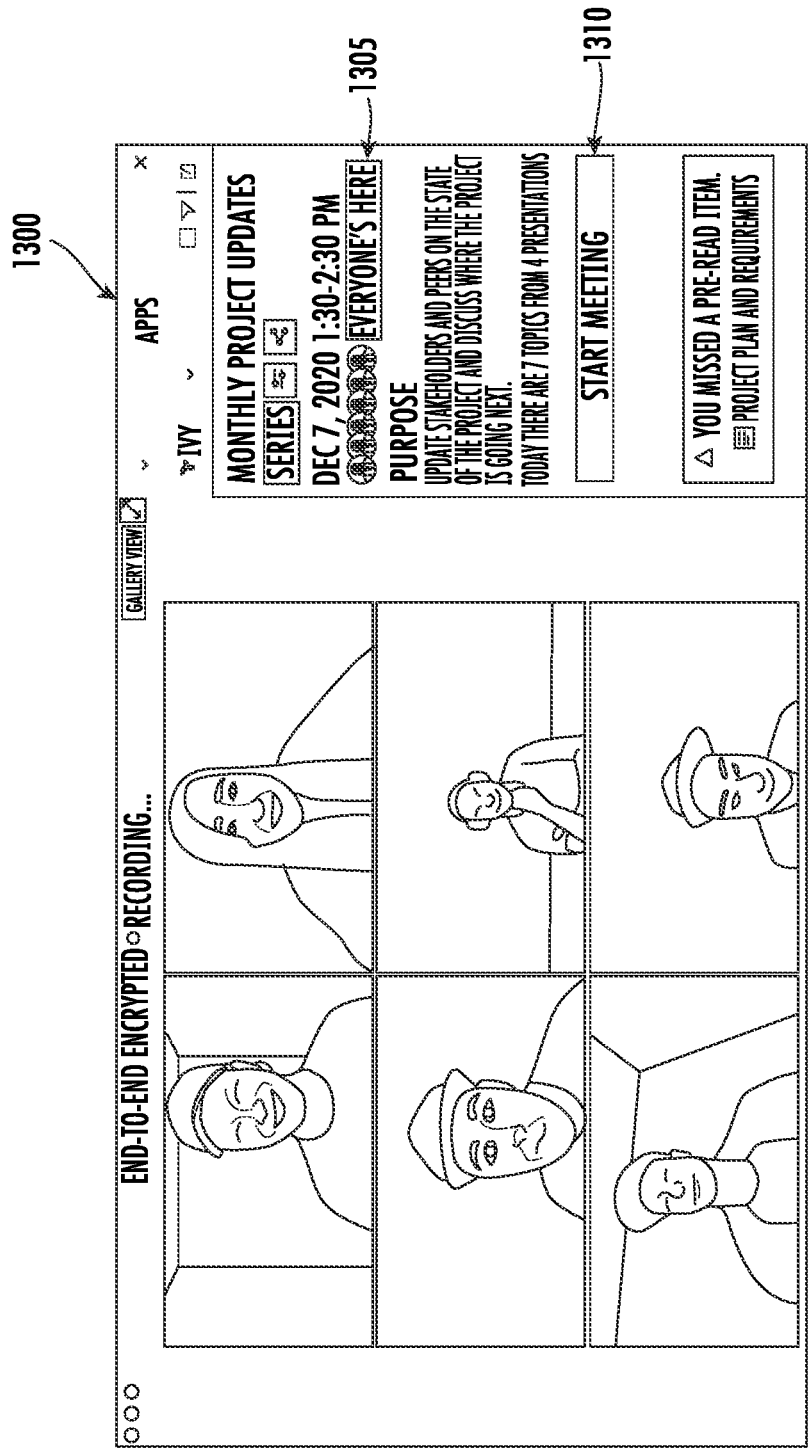
Figure 14:
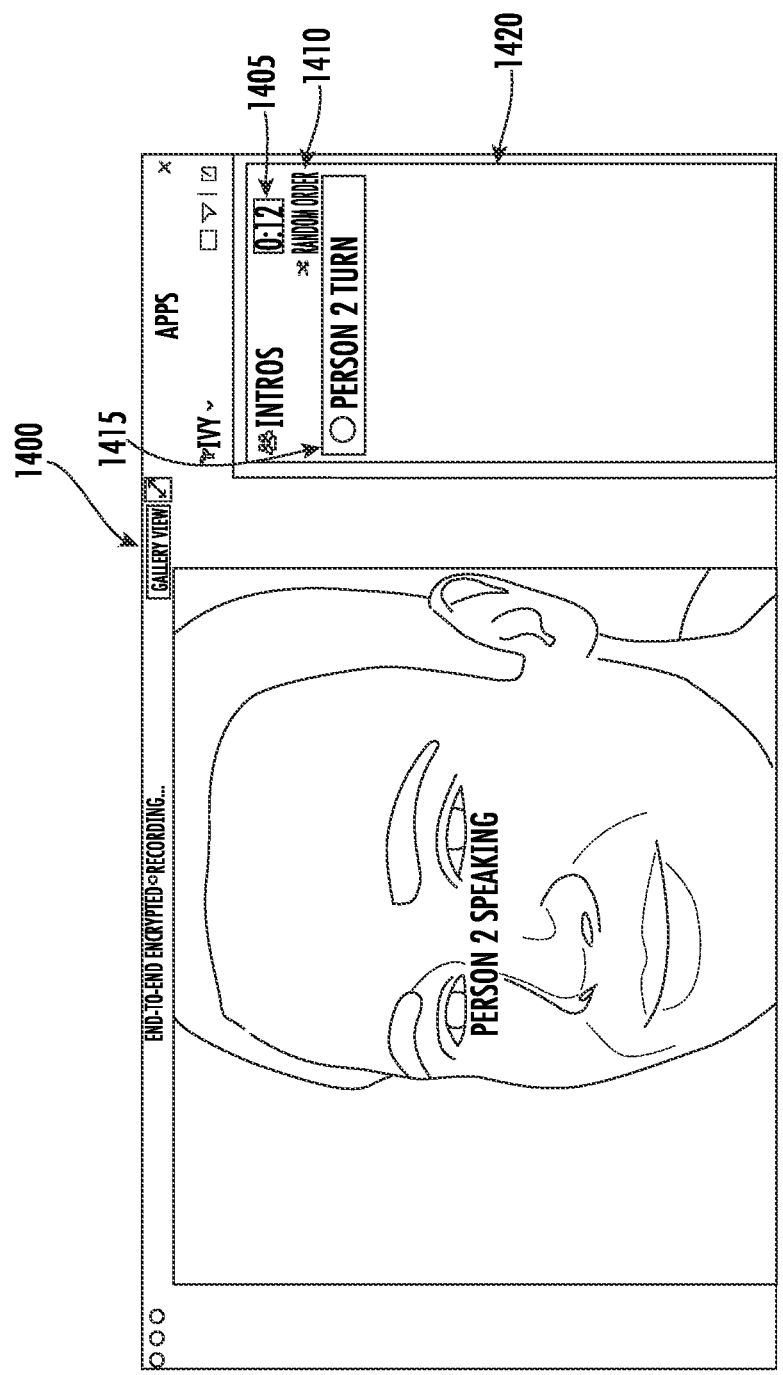
Figure 15:
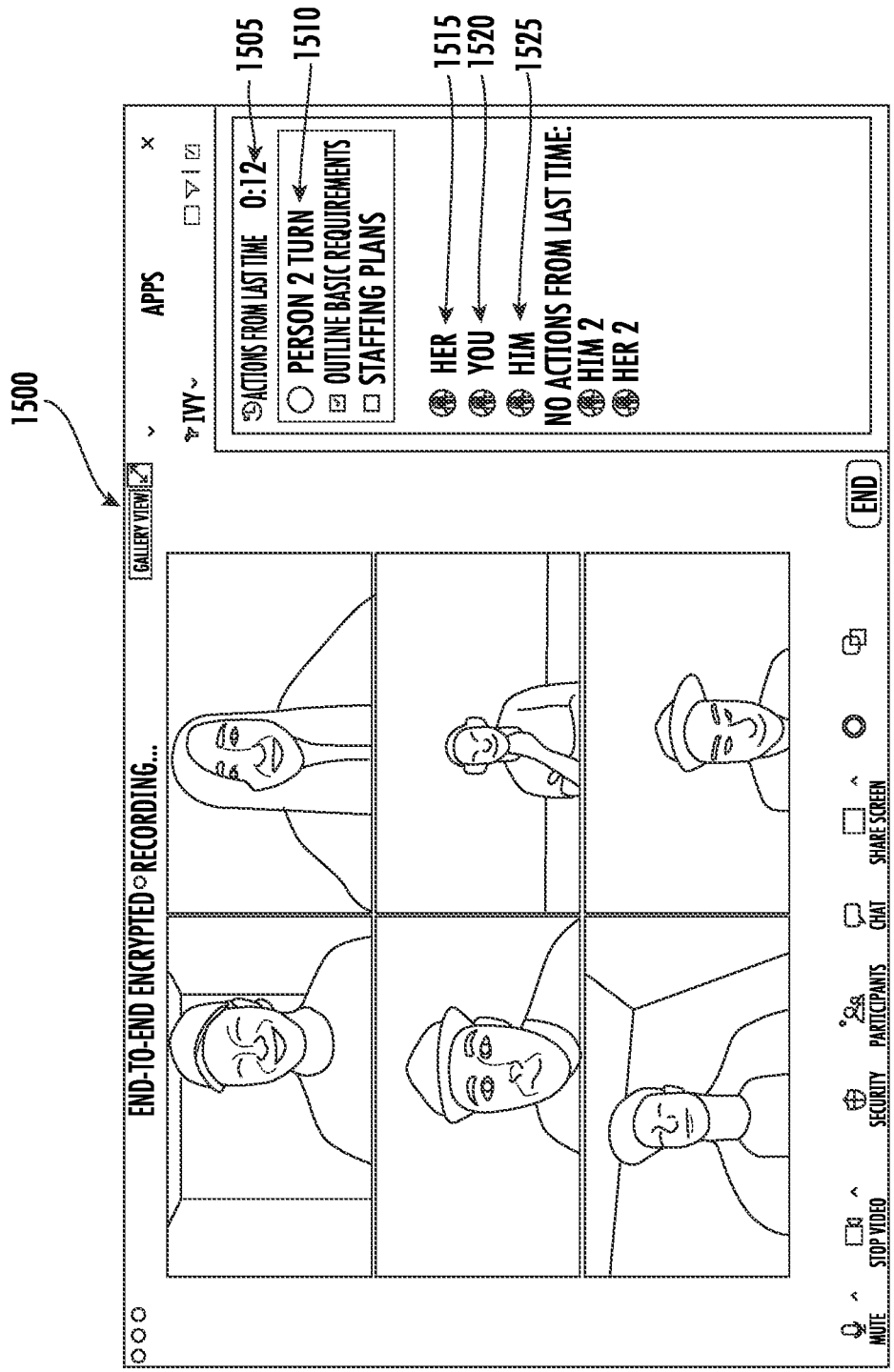
Figure 16:
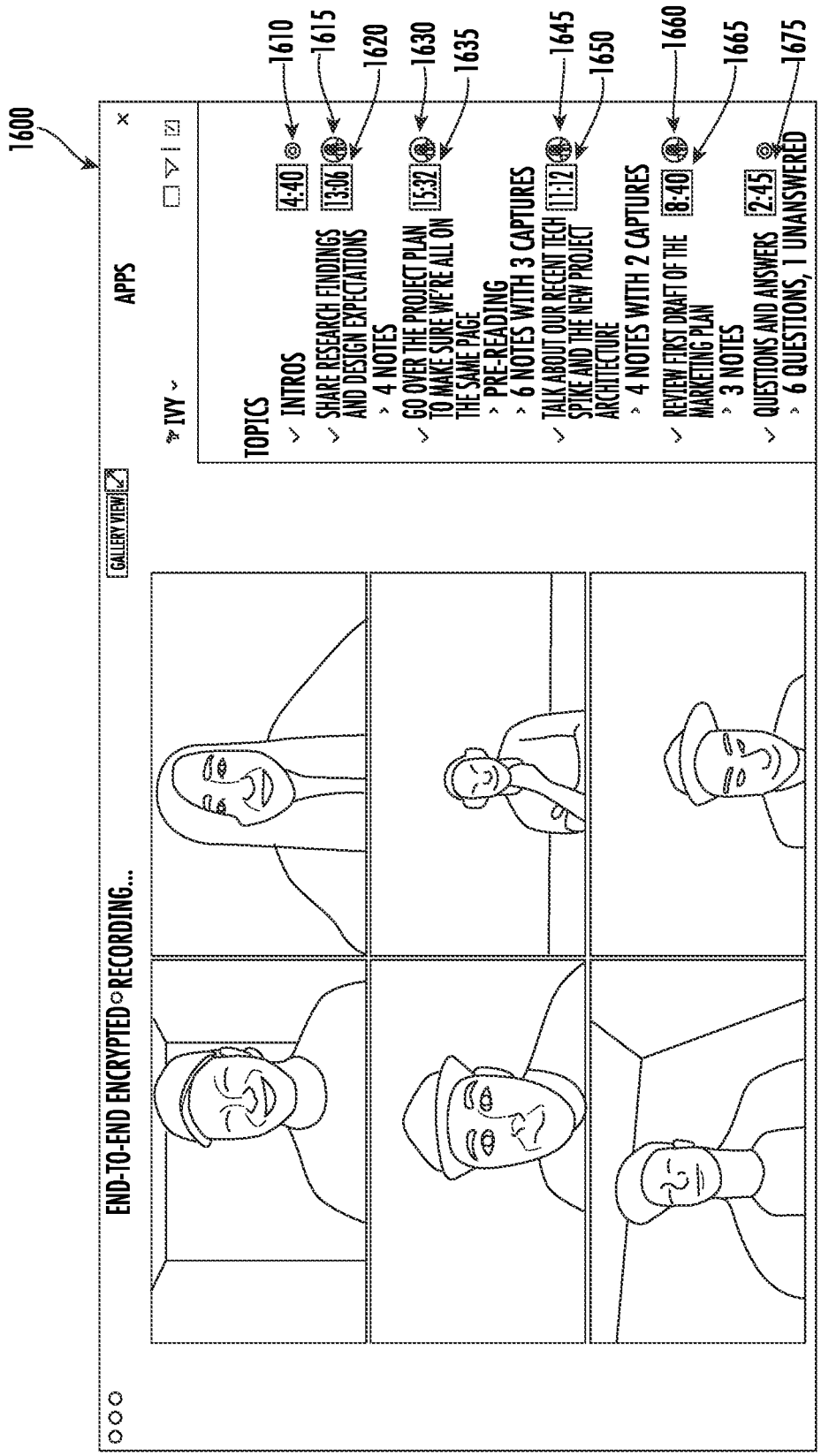

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example collaborative presentation progression interface management system configured to communicate with an audio-video conferencing interface service and two or more client devices in accordance with some example embodiments described herein;

FIG. 2 is a schematic block diagram of example circuitry for use in a shared dynamic collaborative presentation progression interface server in accordance with some example embodiments described herein;

FIG. 3 is a schematic block diagram of example circuitry for use in a client device in accordance with some example embodiments described herein;

FIG. 4A is a flowchart illustrating example operations for generating and managing a shared dynamic collaborative presentation progression interface in accordance with various aspects and embodiments of the subject disclosure;

FIG. 4B is a signal diagram of an example data flow in accordance with various aspects and embodiments of the subject disclosure;

FIG. 5 is a flowchart illustrating example operations for generating and transmitting a transition topic object sequence instructions set for updating the shared dynamic collaborative presentation progression interface in accordance with various aspects and embodiments of the subject disclosure;

FIG. 6 is a flowchart illustrating example operations for determining a presenting order and causing display of visual representations of each of the participating user identifiers in accordance with such determined order in a shared dynamic collaborative presentation progression interface in accordance with various aspects and embodiments of the subject disclosure;

FIG. 7 is a flowchart illustrating example operations for retrieving a topic object sequence set based on an agenda object identifier identified in an agenda object selection request from a participating client device in accordance with various aspects and embodiments of the subject disclosure;

FIG. 8 illustrates an example shared dynamic collaborative presentation progression interface structured in accordance with some example embodiments described herein;

FIG. 9 illustrates an example collaborative conference presentation interface structured in accordance with some example embodiments described herein;

FIG. 10 illustrates an example shared dynamic collaborative presentation progression interface structured in accordance with some example embodiments described herein;

FIG. 11 illustrates an example shared dynamic collaborative presentation progression interface structured in accordance with some example embodiments described herein;

FIG. 12 illustrates an example shared dynamic collaborative presentation progression interface structured in accordance with some example embodiments described herein;

FIG. 13 illustrates an example shared dynamic collaborative presentation progression interface structured in accordance with some example embodiments described herein;

FIG. 14 illustrates an example shared dynamic collaborative presentation progression interface structured in accordance with some example embodiments described herein;

FIG. 15 illustrates an example shared dynamic collaborative presentation progression interface structured in accordance with some example embodiments described herein; and FIG. 16 illustrates an example shared dynamic collaborative presentation progression interface structured in accordance with some example embodiments described herein.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to an example "apparatus." However, elements of the apparatus described herein may be equally applicable to the claimed system, method, and computer program product. Accordingly, use of any such terms should not be taken to limit the spirit and scope of embodiments of the present disclosure.

Overview

Individuals and organizations routinely use audio-video conferencing services (e.g., Zoom®, GoToMeeting®, BlueJeans®, Webex®, Teams®, Google Meet®, or the like) to allow geographically-dispersed users to remotely communicate and collaborate within and across organizations using individual computing devices (e.g., laptops, desktops, smart phones, servers, and/or the like). A variety of information such as important decisions, action items, meeting moments, and/or the like may need to occur during such virtual meetings and participants may desire to efficiently identify an agenda and associated responsible users for each of the topics within the agenda before an audio-video conference presentation has begun and/or during an audio-video conference presentation. Users may also desire to identify specified time periods for each topic of discussion within the audio-video conference presentation such that audio-video conference presentation does not run longer than required or desired.

The volume of participating users and/or presenters in an audio-video conference presentation may cause inefficient time periods to be used tracking down responsible users of an audio-video conference presentation for each topic of the agenda up for discussion. The volume of audio-video conference presentations that each participating user (e.g., presenter of a topic within the presentation) must attend in a day, week, or month has also exploded as more presentations and meetings are moved to the virtual space. When users are participating in such a high volume of virtual audio-video conference presentations, efficiency is lowered as more users become unaware of presenter order, presentation topic within an audio-video conference presentation, a target time for each topic, an elapsed time for each topic, and/or responsible presenters for each topic before and during the audio-video conference presentation.

It is undesirable to require an individual participant to manually organize, circulate, and maintain agendas and assigned presenters for each topic of the agenda as audio-video conference presentations are generated, updated, and/or maintained. It is further undesirable to require users to manually review the audio-video conference presentations after an audio-video conference presentation has been completed in order to find a specific time period for which a desired topic object was discussed in the audio-video conference presentation. Accordingly, the inventors have determined it would be desirable and advantageous to create a collaborative presentation progression interface management system that is configured to programmatically identify or suggest, and effectively disseminate the specified topic order within an agenda, effectively disseminate the responsible topic presenters and effectively disseminate presenter identifiers within the agenda, disseminate target times for each topic object, and/or disseminate summaries of each topic object discussed after the topic object has been completed from an audio-video conference presentation (e.g., Zoom® meeting) to a plurality of users in the collaborative presentation progression interface management system and the plurality of users of the audio-video conferencing interface service.

Various embodiments of the present disclosure provide apparatuses, systems, computer-implemented methods, and computer program products for generating and updating a shared dynamic collaborative presentation progression interface associated with a virtual meeting and sharing the shared dynamic collaborative presentation progression interface to a plurality of users, including those users who participated in the live presentation of the meeting and/or those users who did not. Some such embodiments enhance meeting communication methods by reducing miscommunication, ensuring team alignment, increasing pre-meeting accountability, increasing efficiency within an audio-video conference presentation, and otherwise reducing time and cost expenditures incurred in culling and disseminating relevant information for the meeting and the associated topic objects.

Definitions

As used herein, the term "audio-video conferencing interface service" refers to an application, program, platform, and/or service configured for providing virtual video and/or audio conferencing (e.g., active audio-video conference presentation), webinars, live chats, streaming services, screen-sharing, and other real-time collaborative audio and/or video capabilities configured for display to a plurality of participating client devices. Non-limiting examples of an audio-video conferencing interface service include Zoom®, BlueJeans®, Webex®, Teams®, Google Meet®, and the like.

In some embodiments, an active audio-video conferencing interface service is hosted by an "external resource" such that it is associated with a third-party controlled system and is configured for authenticated communication with a shared dynamic collaborative presentation progression interface system to provide audio-video conferencing functionality to participating client devices. An external resource provides functionality not provided natively by the shared dynamic collaborative presentation progression interface system. The external resource operates on a compiled code base or repository that is separate and distinct from that which supports the shared dynamic collaborative presentation progression interface system. In some embodiments, the external resource may communicate with the shared dynamic collaborative presentation progression interface system, and vice versa, through one or more application program interfaces (APIs). In some embodiments, an active audio-video conferencing interface service is hosted by the shared dynamic collaborative presentation progression interface system.

As used herein, the term "shared dynamic collaborative presentation progression interface" refers to a user interface or sub-user interface of a collaborative presentation progression interface management system that is specially configured to enable a user to view, access, review, modify, edit, emphasize, identify, de-identify, and/or otherwise engage with one or more topic objects of a topic object sequence set associated with an active audio-video conferencing interface presentation. In some embodiments, a shared dynamic collaborative presentation progression interface optionally comprises one or more additional topic objects, one or more active topic objects, one or more active visual emphasis elements, one or more elapsed time objects, one or more initiate topic object sequence set interface components, one or more topic object progression interface components, one or more completion indicators, one or more annotation summaries, one or more participating user identifiers, an upcoming presenter interface element, a rendered listing of agenda objects, a topic object sequence set, one or more respective target times for each target object, and/or one or more indicators of elapsed time (i.e., elapsed time object). For example, the shared dynamic collaborative presentation progression interface 1000 of FIG. 10 is an example of a shared dynamic collaborative presentation progression interface comprising a selectable element for a user of a participating client device to input a target time at element 1020, wherein the selectable element may read "Set time".

A shared dynamic collaborative presentation progression interface is rendered to a participating client device based on data and instructions provided by the collaborative presentation progression interface management system (e.g., shared dynamic collaborative presentation progression interface server). In some embodiments, such data and instructions are facilitated by a dedicated software application running on the participating client device. In other embodiments, such data and instructions are provided through a web browser running on the participating device. Exemplary shared dynamic collaborative presentation progression interfaces may be rendered in any desired form including, but not limited to, as a mobile application for display on a mobile computing device (e.g., a smartphone, table computer, etc.), a webpage or website for display on a mobile or non-mobile computing device via the Internet, and the like. Such a shared interface (e.g., shared dynamic collaborative presentation progression interface) may be shared among participants and their participating client devices such that each participating client device can view the intended display based on one or more settings of the one or more participating client device. Thus, even if the one or more settings for each participating client device render the data of the shared dynamic collaborative presentation progression interface differently between each participating client device, the contents of the data transmitted and shown on each participating client device is the same. That is, the protocol for sending the shared interface (e.g., shared dynamic collaborative presentation progression interface) to each participating client device may vary among the participating client devices as well as format, size, etc. of the resulting interface; however, the content will generally be consistent among participating client devices.

In some embodiments, the shared dynamic collaborative presentation progression interface may comprise different time data objects for each client device, including the one or more participating client devices. In some embodiments, the different time data objects may be based on a time zone of each of the client device, further including the participating client devices, such that each client device comprises a time data object associated with the time zone of the client device's location. In some embodiments, such a time data object may be determined by a location service and/or GPS location. By way of non-limiting example, Alice may be located in a time zone such as Eastern standard time ("EST") zone and Beth may be located in a time zone such as Pacific standard time ("PST") zone and the GUI of the participating client device associated with Alice may be configured by the shared dynamic collaborative presentation progression interface to include a data object comprising the time of day at Alice's location as 12 pm, and in contrast the GUI of the participating client device associated with Beth may be configured by the shared dynamic collaborative presentation progression interface to include a data object comprising the time of day at Beth's location as 9 am. In some embodiments, the shared dynamic collaborative presentation progression interface may configure the GUI of the one or more client devices associated with an audio-video conference service to indicate a plurality of start time data objects associated with an agenda object. In some embodiments, if an agenda object (e.g., a virtual meeting on the audio-video conference service) is associated with a start time, the shared dynamic collaborative presentation progression interface may comprise a start time data object indicating a start time of the agenda object and may be based on the one or more time zones of the client devices associated with the agenda object. By way of non-limiting example, if Alice is in the EST time zone and Beth is in the PST time zone, and an agenda object (e.g., virtual meeting) is set to start at 11 am central standard time ("CST"), the client devices associated with the agenda object for one or more participants in the CST time zone may comprise a start time data object showing 11 am as the start time, the client devices associated with the agenda object for Alice and other participants in EST zone may comprise a start time data object of 12 pm, and the client devices associated with the agenda object for Beth and other participants in PST may comprise a start time data object of 10 am.

The term, "collaborative presentation progression interface management system" refers to a software platform and associated hardware that is configured to support, maintain, and manage shared dynamic collaborative presentation progression interface data associated with determining, tracking, identifying, highlighting, bookmarking, or otherwise emphasizing one or more topic objects associated with an audio-video conferencing interface service. In some embodiments, the collaborative presentation progression interface system, or a portion thereof, is at least partially configured to operate as a portion (e.g., a plug-in, add-on, extension, etc.) of an audio-video conferencing interface service. In some embodiments, the collaborative presentation progression interface system, or a portion thereof, is configured to operate on compiled code bases or repositories that are separate and distinct (e.g., a standalone collaboration server or other computing device) from the audio-video conferencing interface service and/or one or more client devices (e.g., participating client devices) associated with one or more users (e.g., participating users).

The term, "shared dynamic collaborative presentation progression interface server" refers to a software platform and associated hardware that is configured to generate and/or manage shared dynamic collaborative presentation progression interface(s) in association with an audio-video conferencing interface service. The shared dynamic collaborative presentation progression interface server is accessible via one or more computing devices, is configured to monitor active audio-video conference presentation(s), generate a shared dynamic collaborative presentation progression interface, identify, de-identify, determine, track, highlight, and/or otherwise emphasize one or more topic objects associated with an active audio-video conference presentation, and access one or more data repositories, such as a shared dynamic collaborative presentation progression interface repository. The functionality of the shared dynamic collaborative presentation progression interface server may be provided via a single server or a collection of servers having a common functionality, or the functionality of the shared dynamic collaborative presentation progression interface server may be segmented among a plurality of servers or collections of servers performing subsets of the described functionality of the shared dynamic collaborative presentation progression interface server, such as in a cloud networking environment.

A shared dynamic collaborative presentation progression interface server may update and/or maintain a shared dynamic collaborative presentation progression interface that provides for collaborative facilitation of an agenda and/or topic transitioning in audio-video conference presentations. For example, in some embodiments, the shared dynamic collaborative presentation progression interface server is configured to enable a plurality of participating users to access, review, and/or modify/edit a shared dynamic collaborative presentation progression interface at the same time. Changes and/or selections made by respective users (e.g., participating users) to a shared dynamic collaborative presentation progression interface can be automatically stored/saved and synced between all users in real-time. For example, a first participating user may select and/or otherwise activate an initiate topic object sequence set interface component (e.g., click a "Start Meeting" button) or an object progression interface component (e.g., click a "Next Topic" button) in association with a shared dynamic collaborative presentation progression interface, thereby indicating an initiation of a first topic object or progression/transition of topic objects in a topic object sequence set and all participating users may be able to view the updated shared dynamic collaborative presentation progression interface in real time.

The term "shared dynamic collaborative presentation progression interface repository" refers to a location, such as a database stored on a memory device, which is accessible by one or more computing devices for retrieval and storage of data associated with shared dynamic collaborative presentation progression interface(s). For example, the shared dynamic collaborative presentation progression interface repository includes one or more of shared dynamic collaborative presentation progression interface(s), topic object identifier(s), user identifier(s), participating user identifier(s), presentation identifier(s), agenda object identifier(s), and/or the like. The shared dynamic collaborative presentation progression interface repository may be a dedicated device and/or a part of a larger repository. The shared dynamic collaborative presentation progression interface repository may be dynamically updated or be static. In some embodiments, the shared dynamic collaborative presentation progression interface repository is encrypted in order to limit unauthorized access of such shared dynamic collaborative presentation progression interface data.

The terms "data," "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

As used herein, the term "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user for the selected active audio-video conference presentation to the audio-video conferencing interface service and/or a collaborative presentation progression interface management system.

As used herein, the term "participating client device" or "participating client devices" of an active audio-video conference presentation refers to a client device associated with a user identifier identified as disposed in a real-time communicative relation with the live stream presentation of the active audio-video conference presentation.

As used herein, the term "topic object identifier" refers to one or more items of data by which a topic or portion of an active audio-video conference presentation may be identified within a collaborative presentation progression interface management system. For example, a topic object identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "topic object progression interface component" refers to a user interface component, sub-user interface component, or modal that is rendered to a shared dynamic collaborative presentation progression interface and is specially configured to enable a participating user to indicate an intention to progress to another topic object in a topic object sequence set associated with a corresponding active audio-video conference presentation. In some embodiments, a participating user selects, activates, or otherwise interacts with a specific actuator button or interface element rendered to the shared dynamic collaborative presentation progression interface on a visual display of the participating client device (e.g., a user clicking on a "Next Topic" icon during an active audio-video conference presentation), thereby indicating the current topic object is completed and a new topic object should be identified as active.

As used herein, the term "agenda object identifier" refers to one or more items of data by which one or more topics of an active audio-video conference presentation may be identified and ordered within a collaborative presentation progression interface management system. For example, an agenda object identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "completed topic object identifier" refers to one or more items of data by which a topic or portion of an active audio-video conference presentation which has been completed and may be identified within a collaborative presentation progression interface management system. For example, a presentation identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "completed topic object" refers to one or more electronically managed data representing a completed topic, wherein the completed topic is associated with a completed topic object identifier. The completed topic object is a data representation of a completed topic that has, at a previous point in time, been identified by the collaborative presentation progression interface management system (e.g., a shared dynamic collaborative presentation progression interface server) as an active topic object and was subsequently de-identified as the active topic object. For example, in response to monitoring an active audio-video conference presentation and receiving indications of user interaction(s) of one or more participating users with a shared dynamic collaborative presentation topic progression interface rendered to respective displays of participating client devices, the shared dynamic collaborative presentation progression interface server identifies a topic object as an active topic object (e.g., associating the selected topic object with an active topic object identifier) and subsequently de-identifies the topic object as an active topic object (e.g., dissociating the selected topic object from the active topic object identifier) and identifies the topic object as a completed topic object (e.g., associating the selected topic object with a completed topic object identifier). The one or more topic objects may be associated with at least one of a topic object sequence set and/or a transition topic object sequence instruction set to determine a sequence or order in which the topic objects may be completed to render one or more completed topic objects. The completed topic object(s) is correlated to a shared dynamic collaborative presentation interface. In a non-limiting example context, a completed topic object refers to electronically managed data that represents a topic object of a topic object sequence set associated with an active video-conference presentation, wherein the completed topic object indicates one or more topics previously completed by one or more presenters of the active audio-video conference presentation.

As used herein, the term "visual emphasis element" refers to a visual representation in a user interface configured to visually convey information to the user. For example, in some embodiments, a visual emphasis element visually compares an elapsed time of a completed topic object to a target time associated with the completed topic object. In another example, in some embodiments, a visual emphasis element visually compares an elapsed time of an active topic object to a target time associated with the active topic object. In yet another example, in some embodiments, an "active visual emphasis element" visually identifies the active topic object of the topic object sequence set (e.g., as the current topic object as compared to completed topic objects and/or upcoming topic objects) associated with the shared dynamic collaborative presentation progression interface.

To provide context, a visual emphasis element may be determined using various embodiments described herein, such as identifying or de-identifying an active topic object based on an analysis of associated identifiers or performing an analysis of an elapsed time and a target time. Examples of visual representation associated with a visual emphasis element include, but are not limited to, an icon, text, and/or background displayed in a user interface (e.g., shared dynamic collaborative presentation progression interface). In some embodiments, the visual emphasis element may comprise a contextually relevant coloring scheme which may identify one or more colors associated with the content of the configured data object as relevant to the content in order to configure said data object accordingly (e.g., the high importance topic objects may be configured to a red color to highlight said high importance). For example, in a non-limiting illustration, a visual emphasis element for elapsed time associated with a completed or active topic object may comprise text in orange, an orange icon (e.g., an arrow or other indication of overtime), and/or an orange background shading to indicate that the elapsed time associated with the corresponding topic object may be overtime. In a further example, a visual emphasis element for elapsed time associated with a completed or active topic object may comprise text in green, a green icon (e.g., a thumbs up, a checkmark, or other indication of sufficient time, etc.), and/or a green background shading to indicate that the elapsed time associated with the corresponding topic object is adequate, sufficient, or otherwise on target with the target time. In another example, an active visual emphasis element emphasizes and/or otherwise indicates as important a configured data object (e.g., emphasizing as an active topic object in association with the visual representation of a topic object rendered on a shared dynamic collaborative presentation progression interface). Additional examples of visual emphasis elements include emphasizing an icon or text displayed on a user interface (e.g., coloring scheme, highlighted, bolded, italicized, enlarged, shaded, flashing, pulsing, changing font, changing in size, etc.). Additional examples of visual emphasis elements include numerous embodiments described herein and would be understood to include any other visual indicators in light of the present disclosure.

As used herein, the term "completion indicator" refers to a renderable indicator displayed to a shared dynamic collaborative presentation progression interface, the completion indicator associated with one or more completed topic objects and the one or more completed topic object identifiers. In some embodiments, the completion indicator is selected and/or generated from a plurality of completion indicators, each completion indicator associated with a different format, size, placement, type, color, highlight, tag, graphic, figure, and/or type. In some embodiments, the completion indicator is rendered in a position or location of the shared dynamic collaborative presentation progression interface such that it is indicative of a completed topic object in a topic object sequence set.

As used herein, the term "user identifier" refers to refers to one or more items of data by which a user may be identified within a shared dynamic collaborative presentation progression interface system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "presentation identifier" refers to refers to one or more items of data by which an active audio-video conference presentation may be identified within a shared dynamic collaborative presentation progression interface system. For example, a presentation identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "agenda object selection request" refers to an electronically generated digital object that is created by or otherwise originates from a computing device (e.g., a participating client device) indicating that a user has provided an input comprising a request to select an agenda object identifier in association with a collaborative conference presentation interface. In some embodiments, an agenda object selection request is represented via a temporary code that is generated by and/or transmitted from a computing device (e.g., participating client device) to a collaborative presentation progression interface management system (e.g., shared dynamic collaborative presentation progression interface server) as an indication that a participating client device has made the request. In some embodiments, the selection of such an agenda object identifier may comprise a request to present, highlight, tag, bookmark, illustrate, and/or otherwise emphasize the agenda object identifier on a shared dynamic collaborative presentation progression interface. In some embodiments, the selection of such an agenda object identifier may comprise a request to edit the agenda object identifier using text, format, size, style, content, and/or other such data of the agenda object identifier. The selected content of the agenda object selection request may be shared among and accessed by participating client devices on a shared dynamic collaborative presentation progression interface in association with an active audio-video conference presentation. In some embodiments, the agenda object selection request is associated with a variety of metadata such as one or more of a participating user identifier, an agenda object identifier, one or more topic object identifiers, one or more topic object sequence sets, and/or other data for use in managing an agenda object selection request.

As used herein, the term "collaborative conference presentation interface" refers to a user interface, sub-user interface, or modal that is rendered on a shared dynamic collaborative presentation progression interface and is specially configured to display a rendering of one or more agenda objects for the active audio-video conference presentation, one or more of users of participating client devices, and one or more data representing the active audio-video conference presentation. For instance, the collaborative conference presentation interface can be used to configure one or more agenda objects by one or more participating client devices to be associated with an active audio-video conference presentation.

As used herein, the term "display collaborative conference presentation interface request" refers to an electronically generated digital object created by a computing device (e.g., a participating client device) indicating that a user has provided an input comprising a request to access and/or display a collaborative conference presentation interface to a shared dynamic collaborative presentation progression interface associated with an active audio-video conference presentation. In some embodiments, a display collaborative conference presentation interface request is represented via a temporary code that is generated by and/or transmitted from a computing device (e.g., participating client device) to a collaborative presentation progression interface management system (e.g., shared dynamic collaborative presentation progression interface server) as an indication that a participating client device has made the request. In some embodiments, the display collaborative conference presentation interface request is associated with a variety of metadata such as one or more of a participating user identifier, a presentation identifier, and/or other data for use in managing a display collaborative conference presentation interface request.

As used herein, the term "active topic object identifier" refers to one or more items of data by which one or more active topics (e.g., current topic(s) of discussion) of an active audio-video conference presentation may be identified within a collaborative presentation progression interface management system. For example, an active topic object identifier may comprise text string(s), numerical character(s), alphabetical character(s), alphanumeric code(s), ASCII character(s), a pointer, an IP address, a MAC address, a memory address, other unique identifier, or a combination thereof.

As used herein, the term "active topic object" refers to one or more electronically managed data representing a current topic object, wherein the current topic is associated with an active topic object identifier. The active topic object is a data representation of the active topic that is identified by the collaborative presentation progression interface management system (e.g., a shared dynamic collaborative presentation progression interface server) in response to monitoring and identification of one or more topic objects to determine at least an active topic of one or more data objects associated with an agenda topic object identifier and/or a topic object sequence set. For example, in response to monitoring an active audio-video conference presentation and receiving indications of user interaction(s) of one or more participating users with a shared dynamic collaborative presentation topic progression interface rendered to respective displays of participating client devices, a shared dynamic collaborative presentation progression interface server identifies one or more topics currently being discussed in association with the active audio-video conference presentation The one or more topic objects may be associated with at least one of a topic object sequence set and/or a transition topic object sequence instruction set to determine a sequence or order in which the topic objects may be identified and/or rendered as an active topic object. The active topic object is correlated to a shared dynamic collaborative presentation progression interface. In a non-limiting example context, an active topic object refers to electronically managed data that represents the current topic of the associated active video-conference presentation comprised within a topic object sequence set to indicate one or more topics currently discussed by one or more presenters of the active audio-video conference presentation.

As used herein, the term "facilitation topic object" refers to one or more electronically managed data representing one or more specified templates (i.e., facilitation templates) of topic object(s), wherein a template of topic object(s) may comprise one or more topic objects in a specified order and/or specified types of topic objects. The facilitation topic object is a data representation of the one or more topic objects within a specified template that is identified by the collaborative presentation progression interface management system (e.g., a shared dynamic collaborative presentation progression interface server) in response to monitoring and identification of one or more topic objects in a specified template of topic objects. The facilitation topic object may be selected by a selectable link on the shared dynamic collaborative presentation progression interface. The collaborative presentation progression interface management system (e.g., a shared dynamic collaborative presentation progression interface server) may identify the facilitation topic object selected by one or more users of the shared dynamic collaborative presentation progression interface (e.g., a shared dynamic collaborative presentation progression interface server) and, in response to identifying the selected facilitation topic object, may identify and/or select one or more first topic objects to be the active topic object and/or a template of topic objects comprising one or more non-active topic objects (e.g., future active objects in a topic object sequence set determined by the facilitation topic object). For example, in response to monitoring an active audio-video conference presentation and receiving indications of user interaction(s) of one or more participating users with a shared dynamic collaborative presentation topic progression interface rendered to respective displays of participating client devices, a shared dynamic collaborative presentation progression interface server identifies one or more topics in a specified template of a facilitation topic object selected by one or more users. By way of non-limiting example, and in some embodiments, the specified template of the facilitation topic object may comprise a plurality of topic objects associated with an introduction template for an audio-visual conference presentation, where each topic object of the introduction template may comprise a participating user identifier to identify one or more participating user identifiers who will introduce themselves in the audio-visual conference presentation. By way of a non-limiting example, in further embodiments, the introduction template may further comprise a randomizer of the topic objects (e.g., the one or more participating user identifiers may be in a randomized order). By way of non-limiting example, and in some embodiments, an introduction template of the facilitation topic object may comprise an order associated with an order of those participating users (e.g., participating user devices) based on the order in which they joined the audio-video conference presentation and/or accessed the shared dynamic collaborative presentation progression interface server. In some embodiments, the facilitation topic object may comprise one or more prompts for each topic object, such as a prompt asking one or more questions to each participating user of the participating user identifiers identified in the facilitation template of the facilitation topic object (e.g., a user associated with an active topic object of the facilitation template may be prompted by the shared dynamic collaborative presentation progression interface server/shared dynamic collaborative presentation progression interface to say their name, occupation, age, city/state of residence, educational institution attended, and/or any other introductory prompt known in the art).

In some embodiments, the randomizer of the topic objects may further be configured to randomize one or more topic objects associated with one or more specified participating user identifiers. By way of non-limiting example, the shared dynamic collaborative presentation progression interface server may determine whether one or more participating users are present and/or signed into the shared dynamic collaborative presentation progression interface (e.g., signed in to attend the audio-video conference presentation) by matching the participating user identifiers of each of the topic objects in the topic object sequence set to the one or more participating user identifiers present in the shared dynamic collaborative presentation progression interface (e.g., signed into the audio-video conference presentation). In some embodiments, and by way of further example, if any of the participating user identifiers which are determined by the shared dynamic collaborative presentation progression interface server as not in attendance to the audio-video conference presentation, the shared dynamic collaborative presentation progression interface server may randomize the topic objects of the topic object sequence set associated with the absent participating users to the end of the topic object sequence set. By way of non-limiting example, if Alice is late to the audio-video conference presentation and is assigned to the second topic object of the topic object sequence set and Cheri is also late to the audio-video conference presentation and is assigned to the fourth topic object of the topic object sequence set, then the shared dynamic collaborative presentation progression interface server may randomize the second topic object and the fourth topic object at the end of the topic object sequence set such that the fourth topic object is re-assigned to the sixth topic object and the second topic object is reassigned to the seventh topic object of the seven topic objects.

As used herein, the term "participating user identifier" refers to one or more items of data by which one or participants of an active audio-video conference presentation may be identified within a collaborative presentation progression interface management system. For example, a participating user identifier may comprise text string(s), numerical character(s), alphabetical character(s), alphanumeric code(s), ASCII character(s), a pointer, an IP address, a MAC address, a memory address, other unique identifier, or a combination thereof.

The term "topic object sequence set" refers to a set of data objects corresponding to a plurality of topic objects and the specified order of the topic objects based upon one or more indicators by a user (e.g., a selection by one or more users based on user interaction(s) with a shared dynamic collaborative presentation topic progression interface, wherein one or more users may select and/or input an order of topic objects for an audio-video conference presentation). For example, in response to monitoring an active audio-video conference presentation and receiving indications from user interaction(s) of one or more participating users with a shared dynamic collaborative presentation topic progression interface rendered to respective displays of participating client devices, a shared dynamic collaborative presentation progression interface server may identify one or more topics to be discussed in association with the active audio-video conference presentation. In some embodiments, the topic object sequence set may be a set of data objects randomly selected by the shared dynamic collaborative presentation progression interface server. For example, the shared dynamic collaborative presentation progression interface server may, in response to one or more user indication(s), the shared dynamic collaborative presentation progression interface server may monitor one or more inputs by a user selecting a randomizer (e.g., such as a button labeled "randomize") for the topic object sequence set and generate the topic object sequence set using a randomizer method. Such randomizers methods may comprise at least one of a random number generator or a pseudo-random number generator.

The term "identify random presentation order event" refers to an electrically generated digital object that is generated and/or created by a computing device (e.g., a participating client device), based on one or more user interaction(s) with the shared dynamic collaborative presentation topic progression interface, and transmitted to the shared dynamic collaborative presentation progression interface system, the identify random presentation order event indicating a request to identify and/or generate a random presentation order associated with the audio-video conference presentation. In some embodiments, the identify random presentation order event is associated with randomizing an order of participating user identifiers for presenting one topic object and/or a plurality of topic objects. In some embodiments, the identify random presentation order event is associated with randomizing an order of topic objects associated with the audio-video conference presentation. For example, a user of the shared dynamic collaborative presentation progression interface system interacting with the shared dynamic collaborative presentation topic progression interface via a participating client device may select a button configured on a GUI of the shared dynamic collaborative presentation progression interface, such as a button configured to read, "Randomize" or "Random Order" (such as depicted by the button 1410 of FIG. 14, which generates a temporary code and/or instructions that are transmitted to and detected by the shared dynamic collaborative presentation progression interface system, indicating the user's request to randomize the participating user identifiers and/or topic objects associated with the audio-video conference presentation. In some embodiments, the shared dynamic collaborative presentation progression interface server determines a randomized presenting order (e.g., of topic objects and/or participating user identifiers) using one or more randomizer methods. In some embodiments, such randomizer methods comprise at least one of a random number generator or a pseudo-random number generator. In some embodiments, the entire random presenting order is defined at once. Additionally or alternatively, a randomizer method is used anew at each position.

The term "initiate topic object sequent set event" refers to an electrically generated digital object that is generated and/or created by a computing device (e.g., a participating client device), based on one or more user interaction(s) with the shared dynamic collaborative presentation topic progression interface, and transmitted to the shared dynamic collaborative presentation progression interface system, the initiate topic object sequence event indicating a request to start, commence, or otherwise initiate the topic object sequence set associated with the shared dynamic collaborative presentation topic progression interface and the audio-video conference presentation. For example, a user of the shared dynamic collaborative presentation progression interface system interacting with the shared dynamic collaborative presentation topic progression interface via a participating client device may select a button configured on a GUI of the shared dynamic collaborative presentation progression interface, such as a button configured to read, "Start meeting" or "Get Started." (such as depicted by the button [Reference Numeral] of FIG. 7 or FIG. 10), which generates a temporary code and/or instructions that are transmitted to and detected by the shared dynamic collaborative presentation progression interface system, indicating the user's request to start the flow of the topic object sequence set, such as identify a first topic object of the topic object sequence set as the active topic object. In some embodiments, the initiate topic object sequence set event is associated with a request to start the audio-video conference presentation. For example, in response to detecting an initiate topic object sequence set event that is associated with a request to start the audio-video conference presentation, in addition to initiating the topic object sequence set event, in some embodiments, the shared dynamic collaborative presentation progression interface system further transmits such event (or generates a new event based on detection of the initiate topic object sequence set event) to the audio-video conferencing interface service. Additionally or alternatively, in some embodiments, upon detection of the initiate topic object sequence set event, the shared dynamic collaborative presentation progression interface system initiates one or more timers associated with the topic object sequence set event and/or the audio-video conference presentation.

The term "topic object progression event" refers to an electronically generated digital object that is generated and/or created by a computing device (e.g., a participating client device), based on one or more user interaction(s) with the shared dynamic collaborative presentation topic progression interface, and transmitted to the shared dynamic collaboration presentation progression interface system, the topic object progression event indicating a request to identify and/or generate a topic object progression associated with the audio-video conference presentation. In some embodiments, the topic object progression event is associated with an ordering of the topic objects associated with the audio-video conference presentation. For example, a user of the shared dynamic collaborative presentation progression interface system interacting with the shared dynamic collaborative presentation topic progression interface via a participating client device may select a button configured on a GUI, such as a button configured to read, "Next Topic" (such as depicted by 1120 of FIG. 11, which generates a temporary code and/or instructions that are transmitted to and detected by the shared dynamic collaborative presentation progression interface system, indicating the user's request to proceed to a different topic than the current topic (e.g., active topic object) in the audio-video conference presentation.

The term "transition topic object sequence instructions set" refers to instructions provided by the collaborative presentation progression interface management system (e.g., shared dynamic collaborative presentation progression interface server) and transmitted to one or more participating client devices to render a shared dynamic collaborative presentation progression interface. For example, the transition topic object sequence instruction set may be transmitted to one or more participating client devices for updating the shared dynamic collaborative presentation progression interface during the progression of the agenda for an audio-video conference presentation, such as by following the topic object sequence set as it progresses through one or more active topic objects and/or one or more completed topic objects. The transition topic object sequence set may update the one or more configured GUIs of the one or more participating client devices comprising the shared dynamic collaborative presentation progression interface to update the shared dynamic collaborative presentation progression interface as each topic of the topic object sequence set is satisfied (e.g., completed) and/or activated (e.g., currently discussed and/or selected for discussion).

The term "upcoming presenter notification element" refers to a visual representation of one or more users in a user interface configured to visually convey information of the one or more users to a user of a computing device associated with the collaborative presentation progression interface management system (e.g., shared dynamic collaborative presentation progression interface server). For example, in some embodiments, an upcoming presenter notification element may visually indicate an order of presenters (e.g., participating users of the participating client devices) of the audio-video conference presentation, which may include one or more identifying data objects associated with the users (e.g., names, usernames, email addresses, phone numbers, icons, pictures, etc., associated with the one or more participating users of the participating client devices). For example, a list of users and/or identifying data objects associated with the users 1515, 1520, and 1525 of FIG. 15 are examples of an upcoming presenter notification element.

The term "display upcoming presenter notification event" refers to data generated based on the topic object sequence set and one or more completed topic objects, one or more active topic objects, and/or one or more upcoming topic objects (e.g., not-yet active topic objects which, according to the topic object sequence set, are upcoming on the list of topics within the topic object sequence set), wherein the display upcoming presenter notification event may comprise instructions transmitted to one or more participating client devices associated with one or more users associated with a next topic object or a plurality of topic objects on the topic object sequence set to indicate to the users that the associated topic for each user is upcoming and/or next. For example, in some embodiments, the display upcoming presenter notification event may comprise a GUI configured to indicate to the specific user of the participating client device that the topic object associated with the user is upcoming in the topic object sequence set. For instance, the display upcoming presenter notification event may be indicated on a configured GUI by a pop-up window, a graphic, an electronically-generated sound, a flash of light, and other such electronically generated indicating instances. For example, a configured GUI of the participating client device may comprise an indication to the user, such as elements 1515, 1520, and 1525 of FIG. 15, which is an example of a display upcoming presenter notification event.

The term "elapsed time object" refers to a visual representation in a user interface (e.g., shared dynamic collaborative presentation progression interface) to visually convey information to the user. For example, in some embodiments, an elapsed time object visually indicates an elapsed time (e.g., time already spent or time already taken to discuss, show, and/or explain a topic associated with one or more completed topic objects and/or one or more active topic objects) of one or more topic objects, such as one or more completed topic objects which have been discussed and/or completed. In some embodiments, an elapsed time object may visually indicate a current time spent and/or time taken to discuss an active topic object of the audio-video conference presentation. In some embodiments, the elapsed time object may comprise a target time for the topic object to be discussed, wherein the elapsed time may comprise time data beyond (e.g., over) the target time indicating the time taken to discuss the associated topic object went longer than the target time of the associated topic object. For example, the time and/or clock 1405 of FIG. 14 and 1505 of FIG. 15 are examples of an elapsed time objects. For example, the time and/or clock of 1210 and/or 1215 of FIG. 12 are examples of a target time.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example collaborative presentation progression interface management system 200 configured to communicate with an audio-video conferencing interface service and/or two or more client devices 101A-101N in accordance with some example embodiments described herein. Users may access a collaborative presentation progression interface management system 200 via a communications network 102 using one or more of client devices 101A-101N. Collaborative presentation progression interface management system 200 may comprise a shared dynamic collaborative presentation progression interface server 210 in communication with at least one repository, such as shared dynamic collaborative presentation progression interface repository 215. Such repository(ies) may be hosted by the shared dynamic collaborative presentation progression interface server 210 or otherwise hosted by devices in communication with the shared dynamic collaborative presentation progression interface server 210. The collaborative presentation progression interface management system 200 is, in some embodiments, able to generate a shared dynamic collaborative presentation progression interface in association with an audio-video conferencing interface service, as will be described below.

Shared dynamic collaborative presentation progression interface server 210 may include circuitry, networked processors, or the like configured to perform some or all of the shared dynamic collaborative presentation progression interface server-based processes described herein (e.g., generate and/or transmit commands and instructions for rendering a shared dynamic collaborative presentation progression interface to client devices 101A-101N, using data from, for example, shared dynamic collaborative presentation progression interface repository 215), and may be any suitable network server and/or other type of processing device. In this regard, the shared dynamic collaborative presentation progression interface server 210 may be embodied by any of a variety of devices, for example, the shared dynamic collaborative presentation progression interface server 210 may be embodied as a computer or a plurality of computers. For example, shared dynamic collaborative presentation progression interface server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, shared dynamic collaborative presentation progression interface server 210 may be located remotely from the shared dynamic collaborative presentation progression interface repository 215, although in other embodiments, the shared dynamic collaborative presentation progression interface server 210 may comprise the shared dynamic collaborative presentation progression interface repository 215. The shared dynamic collaborative presentation progression interface server 210 may, in some embodiments, comprise several servers or computing devices performing interconnected and/or distributed functions. Despite the many arrangements contemplated herein, shared dynamic collaborative presentation progression interface server 210 is shown and described herein as a single computing device to avoid unnecessarily overcomplicating the disclosure.

Shared dynamic collaborative presentation progression interface server 210 can communicate with one or more client devices 101A-101N and/or an audio-video conferencing interface service 105 via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the collaborative contextual summary interface management system 200.

Shared dynamic collaborative presentation progression interface repository 215 may be stored by any suitable storage device configured to store some or all of the information described herein (e.g., memory 201 of the shared dynamic collaborative presentation progression interface server 210 or a separate memory system separate from the shared dynamic collaborative presentation progression interface server 210, such as one or more database systems, backend data servers, network databases, cloud storage devices, or the like provided by another device (e.g., online application or 3rd party provider), such as a Network Attached Storage (NAS) device or devices, or as a separate database server or servers). Shared dynamic collaborative presentation progression interface repository 215 may comprise data received from the collaborative presentation progression interface server 210 (e.g., via a memory 201 and/or processor(s) 202) and/or a client device 101A-101N, and the corresponding storage device may thus store this data. Shared dynamic collaborative presentation progression interface repository 215 includes information accessed and stored by the Shared dynamic collaborative presentation progression interface server 210 to facilitate the operations of the collaborative presentation progression interface management system 200. As such, Shared dynamic collaborative presentation progression interface repository 215 may include, for example, without limitation, user identifier(s), elapsed time identifier(s), target time identifier(s), agenda object identifier(s), topic object identifier(s), and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the shared dynamic collaborative presentation progression interface server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the Shared dynamic collaborative presentation progression interface to a user and otherwise providing access to the collaborative presentation progression interface management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one Shared dynamic collaborative presentation progression interface, which may be provided by the collaborative presentation progression interface management system 200.

In embodiments where a client device 101A-101N is a mobile device, such as a smartphone or tablet, the client device 101A-101N may execute an "app" to interact with the collaborative presentation progression interface management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the collaborative presentation progression interface management system 200 via a web browser. As yet another example, the client devices 101A-101N may include various hardware or firmware designed to interface with the collaborative presentation progression interface management system 200. Example embodiments contemplated herein may have various form factors and designs but will nevertheless include at least the components illustrated in FIG. 3 and described in connection therewith.

Example Apparatuses for Implementing Embodiments of the Present Disclosure

FIG. 2 shows a schematic block diagram of example circuitry, some or all of which may be included in a shared dynamic collaborative presentation progression interface server 210. In accordance with some example embodiments, shared dynamic collaborative presentation progression interface server 210 may include various means, such as memory 201, processor 202, input/output circuitry 203, and/or communications circuitry 204. Moreover, in some embodiments, shared dynamic collaborative presentation progression interface circuitry 205 may also or instead be included in the shared dynamic collaborative presentation progression interface server 210. For example, where shared dynamic collaborative presentation progression interface circuitry 205 is included in shared dynamic collaborative presentation progression interface server 210, shared dynamic collaborative presentation progression interface circuitry 205 may be configured to facilitate the functionality discussed herein regarding capturing content of one or more capture types and generating, causing storage of, updating, and/or retrieving shared dynamic collaborative presentation progression interface(s). An apparatus, such as shared dynamic collaborative presentation progression interface server 210, may be configured, using one or more of the circuitry 201, 202, 203, 204, and 205, to execute the operations described above with respect to FIG. 1 and below in connection with FIGS. 4A, 4B, 5-7 and 14-16.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the shared dynamic collaborative presentation progression interface server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the shared dynamic collaborative presentation progression interface server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, shared dynamic collaborative presentation progression interface server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., shared dynamic collaborative presentation progression interface server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling shared dynamic collaborative presentation progression interface server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by shared dynamic collaborative presentation progression interface server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as shared dynamic collaborative presentation progression interface server 210. The plurality of processors may be in operative communication with each other and may be collectively configured to perform one or more functionalities of shared dynamic collaborative presentation progression interface server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause shared dynamic collaborative presentation progression interface server 210 to perform one or more of the functionalities of shared dynamic collaborative presentation progression interface server 210 as described herein.

In some embodiments, shared dynamic collaborative presentation progression interface server 210 further includes input/output circuitry 203 that may, in turn, be in communication with processor 202 to provide an audible, visual, mechanical, or other output and/or, in some embodiments, to receive an indication of an input from a user, a client device 101A-101N, audio-video conferencing interface service 105, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where shared dynamic collaborative presentation progression interface server 210 may be implemented as an end-user machine or other type of device designed for complex user interactions. In some embodiments (like other components discussed herein), input/output circuitry 203 may even be eliminated from shared dynamic collaborative presentation progression interface server 210. Input/output circuitry 203 may be in communication with memory 201, communications circuitry 204, and/or any other component(s), such as via a bus. Although more than one input/output circuitry and/or other component can be included in shared dynamic collaborative presentation progression interface server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with shared dynamic collaborative presentation progression interface server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by shared dynamic collaborative presentation progression interface server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of shared dynamic collaborative presentation progression interface server 210, such as via a bus.

In some embodiments, shared dynamic collaborative presentation progression interface circuitry 205 may also or instead be included and configured to perform the functionality discussed herein related to generating and updating a shared dynamic collaborative presentation progression interface(s). In some embodiments, shared dynamic collaborative presentation progression interface circuitry 205 includes hardware, software, firmware, and/or a combination of such components, configured to support various aspects of such shared dynamic collaborative presentation progression interface-related functionality, features, and/or services of the shared dynamic collaborative presentation progression interface server 210 as described herein (e.g., designed to generate a shared dynamic collaborative presentation progression interface based upon at least one or more topic objects within a topic object sequence set). It should be appreciated that in some embodiments, shared dynamic collaborative presentation progression interface circuitry 205 performs one or more of such exemplary actions in combination with another set of circuitry of the shared dynamic collaborative presentation progression interface server 210, such as one or more of memory 201, processor 202, input/output circuitry 203, and communications circuitry 204. For example, in some embodiments, shared dynamic collaborative presentation progression interface circuitry 205 utilizes processing circuitry, such as the processor 202 and/or the like, to perform one or more of its corresponding operations. In some instances, the shared dynamic collaborative presentation progression interface circuitry 205 may generates an initial interface that is subsequently modified by captured content data object(s) and/or the like. In a further example, in some embodiments, some or all of the functionality shared dynamic collaborative presentation progression interface circuitry 205 may be performed by processor 202. In this regard, some or all of the example processes and algorithms discussed herein can be performed by at least one processor 202 and/or shared dynamic collaborative presentation progression interface circuitry 205. It should also be appreciated that, in some embodiments, shared dynamic collaborative presentation progression interface circuitry 205 may include a separate processor, specially configured field programmable gate array (FPGA), or application specific interface circuit (ASIC) to perform its corresponding functions.

Additionally or alternatively, in some embodiments, shared dynamic collaborative presentation progression interface circuitry 205 utilizes memory 201 to store collected information. For example, in some implementations, shared dynamic collaborative presentation progression interface circuitry 205 includes hardware, software, firmware, and/or a combination thereof, that interacts with shared dynamic collaborative presentation progression interface repository 215 and/or memory 201 to send, retrieve, update, and/or store data values embodied by and/or associated with shared dynamic collaborative presentation progression interface data, user identifier(s), elapsed time identifier(s), target time identifier(s), agenda object identifier(s), topic object identifier(s), and associated data that is configured for association with, for example, generating and/or updating a shared dynamic collaborative presentation progression interface, and to support the operations of the shared dynamic collaborative presentation progression interface circuitry 205 and the remaining circuitry. Additionally or alternatively, in some embodiments, shared dynamic collaborative presentation progression interface circuitry 205 utilizes input/output circuitry 203 to facilitate user output (e.g., causing rendering of one or more user interface(s) such as a shared dynamic collaborative presentation progression interface), and/or to receive user input (e.g., user clicks, user taps, keyboard interactions, user gesture, and/or the like). Additionally or alternatively still, in some embodiments, the shared dynamic collaborative presentation progression interface circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of shared dynamic collaborative presentation progression interface server 210 to implement various operations, including the examples shown herein. As such, a series of computer-readable program code portions may be embodied in one or more computer program products and can be used, with a device, shared dynamic collaborative presentation progression interface server 210, database, and/or other programmable apparatus, to produce the machine-implemented processes discussed herein. It is also noted that all or some of the information discussed herein can be based on data that is received, generated and/or maintained by one or more components of the shared dynamic collaborative presentation progression interface server 210. In some embodiments, one or more external systems (such as a remote cloud computing and/or data storage system) may also be leveraged to provide at least some of the functionality discussed herein.

Referring now to FIG. 3, the client devices (e.g., client device 101A-101N) or the like, may be embodied by one or more computing systems, such as apparatus 300 shown in FIG. 3. FIG. 3 is a schematic block diagram showing example circuitry, some or all of which may be included in an example apparatus 300, configured to enable a user to access the shared dynamic collaborative presentation progression interface management system 200 and/or the audio-video conferencing interface service 105 in accordance with certain embodiments of the present disclosure. For example, in some embodiments, the apparatus 300 embodies a client device 101A-101N and is configured to enable a user to interact with the audio-video conferencing interface service 105 to access an active audio-video conference presentation that is configured for display to participating client devices and/or the shared dynamic collaborative presentation progression interface management system 200 to capture and/or review selected content.

In accordance with some example embodiments, apparatus 300 may include various means, such as memory 301, processor 302, input/output circuitry 303, and/or communications circuitry 304. Apparatus 300, such as a client device 101A-101N, may be configured, using one or more of the circuitry 301, 302, 303, and 304, to execute the operations described above with respect to FIG. 1 and below in connection with FIGS. 4-7.

In some embodiments, apparatus 300 communicates with shared dynamic collaborative presentation progression interface management system 200 (for example, embodied by the shared dynamic collaborative presentation progression interface server 210 as depicted and described with respect to FIG. 2). It should be appreciated that, in some embodiments, a shared dynamic collaborative presentation progression interface management system 200 communicates with any number of apparatus(es) 300. It should be appreciated that the components 301-304 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., shared dynamic collaborative presentation progression interface data, user identifier(s), elapsed time identifier(s), target time identifier(s), agenda object identifier(s), topic object identifier(s), and/or the like) for generating a shared dynamic collaborative presentation progression interface. That is, the apparatus 300, in some embodiments, is configured, using one or more sets of circuitry 301, 302, 303, and/or 304, to execute the operations described herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of shared dynamic collaborative presentation progression interface server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

Example Operations for Generating, Updating, and/or Otherwise Managing a Shared Dynamic Collaborative Presentation Progression Interface The method, apparatus (e.g., shared dynamic collaborative presentation progression interface server 210), and computer program product of an example embodiment will now be described in conjunction with the operations illustrated in FIGS. 4A-7.

With reference to FIG. 4A, a flowchart is provided broadly illustrating a series of operations or process blocks for shared dynamic collaborative presentation progression interface generation in association with an audio-video conferencing interface service, in accordance with some example embodiments of the present disclosure. The operations illustrated in FIG. 4A may, for example, be performed by, with the assistance of, and/or under the control of one or more apparatuses, such as shared dynamic collaborative presentation progression interface server 210, as described above. In this regard, performance of the operations may invoke one or more of memory 201, processor 202, input/output circuitry 203, communications circuitry 204, and/or collaborative contextual summary interface circuitry 205. Certain operations may be considered optional, as indicated by the dashed lines.

As shown in operation 405, the apparatus (e.g., shared dynamic collaborative presentation progression interface server 210) includes means, such as processor 202, input/output circuitry 203, communications circuitry 204, and/or the like, for monitoring an active audio-video conference presentation that is configured for rendering to respective displays of a plurality of participating client devices by an audio-video conferencing interface service. By way of example, prior to or during an active audio-video conference presentation, a user provides the shared dynamic collaborative presentation progression interface server 210 with access to the active audio-video conference presentation. For example, in some embodiments, the user provides the shared dynamic collaborative presentation progression interface server with access by simply providing login credentials and data of the audio-video conferencing interface services to the shared dynamic collaborative presentation progression interface server 210. In some embodiments, the user may provide the shared dynamic collaborative presentation progression interface server with access by granting limited access to a protocol such as an open-standard authorization protocol like OAuth (e.g., OAuth 1.0, OAuth 2.0, or any such OAuth version hereinafter generated or created). In some embodiments, a user may provide credentials, consent, and/or privileges to the shared dynamic collaborative presentation progression interface server to allow the shared dynamic collaborative presentation progression interface server to share a token to the open-standard authorization protocol, for the open-standard authorization protocol to access the shared dynamic collaborative presentation progression interface server and/or shared dynamic collaborative presentation progression interface for a specific agenda object or meeting. In some embodiments, an admin device may provide credentials, privileges, and/or consent to the shared dynamic collaborative presentation progression interface server to share a token to the open-standard authorization protocol, for the open-standard authorization protocol to access the shared dynamic collaborative presentation progression interface server and/or shared dynamic collaborative presentation progression interface for all agendas and/or meetings within a specified time period, for specified participating users, and/or for access to all meetings within a specific organization.

In some embodiments, the active audio-video conference presentation is a live streaming presentation displayed in real time by the audio-video conferencing interface service to each of the participating client devices. By way of non-limiting example, Alice, Beth and Cheri are users accessing and participating in a live virtual meeting as it is displayed in real time. Client devices 101A-101N associated with the user identifiers corresponding to Alice, Bethany and Cheri are known as participating client devices. In still other embodiments, the active audio-video conference presentation is a stored playback presentation that is configured to be displayed to participating client devices and/or non-participating client devices. By way of non-limiting example, after completion of the live streaming presentation, Alice can use her participating client device to access a stored playback presentation of the active audio-video conference presentation. In a further non-limiting example, Debbie, who did not participate in the live virtual meeting, can use her non-participating client device to access the stored playback presentation and to access the specific time periods associated with each topic object of the topic object sequence set (e.g., by a selectable link), such that Debbie may access only the specific time period of the audio-video presentation associated with the selected topic object.

As shown by operation 410, the apparatus (e.g., collaborative contextual summary interface server 210) includes means, such as processor 202, input/output circuitry 203, communications circuitry 204, collaborative contextual summary interface circuitry 205 and/or the like, for generating a shared dynamic collaborative presentation progression interface. In some embodiments, the shared dynamic collaborative presentation progression interface is generated by a shared dynamic collaborative presentation progression interface server 210 and transmitted to one or more client devices 101A-101N. In some embodiments, the shared dynamic collaborative presentation progression interface is associated with a topic object sequence set.

In some embodiments, the shared dynamic collaborative presentation progression interface is configured for rendering to the respective displays of the plurality of participating client devices in association with the active audio-video conference presentation. Each client device 101A-101N may comprise a GUI configured by the shared dynamic collaborative presentation progression interface, wherein each instance of the shared dynamic collaborative presentation progression interface on each client device 101A-101N may comprise the same content data of the shared dynamic collaborative presentation progression interface in one or more different interface embodiments. By way of example, the audio-video conference presentation may be used to configure the GUI of the participating client devices to each of the one or more participating client devices. For example, an audio-video conferencing interface server 105 may be in communication with the collaborative presentation progression interface management system 200, and by way of the collaborative presentation progression interface management system 200 in communication with one or more client devices 101A-101B via network, the audio-video conference presentation generated using the audio-video conference interface server 105 may be transmitted as a shared dynamic collaborative presentation progression interface to the one or more client devices.

By way of non-limiting example, the shared dynamic collaborative presentation progression interface of the participating client device associated with Alice may comprise content (e.g., an audio-video conference presentation) in a specified format (e.g., the icons of the shared dynamic collaborative presentation progression interface may comprise one set of sizes; text of the shared dynamic collaborative presentation progression interface may comprise different fonts, sizes, italicizing, bolding, highlighting, and other such design elements of the participating client device and associated interface). Further, by way of non-limiting example, the shared dynamic collaborative presentation progression interface of the participating client device associated with Beth may comprise the same interface element as Alice, but in one or more different formats. Such specified formats in the shared dynamic collaborative presentation progression interface may be controlled locally on the participating client devices by way of one or more user-selected settings and/or device-specific settings. Such example embodiments of the shared dynamic collaborative presentation progression interface configured on a client device may be shown in FIGS. 13, 14, 15, and 16, as interfaces 1300, 1400, 1500, and 1600, respectively.

As shown by operation 415, the apparatus (e.g., collaborative contextual summary interface server 210) includes means, such as processor 202, input/output circuitry 203, communications circuitry 204, collaborative contextual summary interface circuitry 205 and/or the like, for transmitting the shared dynamic collaboration presentation progression interface to the plurality of participating client devices. By way of example, and as discussed hereinabove, the shared dynamic collaboration presentation progression interface may be transmitted to one or more client devices 110A-110N from the collaborative presentation progression interface management system 200 via network 102.

As shown by operation 420, the apparatus (e.g., collaborative contextual summary interface server 210) includes means, such as processor 202, input/output circuitry 203, communications circuitry 204, collaborative contextual summary interface circuitry 205 and/or the like, for receiving an initiate topic object sequence set event from at least one participating client device of the plurality of participating client devices. By way of non-limiting example, in association with an active audio-video conference presentation, a user (e.g., Alice) may interact with a client device 101A-101N that is in network communication with the collaborative presentation progression interface management system 200 to initiate, or start, an audio-video conference presentation. Such an indication (e.g., initiate topic object sequence set event) may comprise the user selecting an element (e.g., a "button" configured to be electronically selected on a client device) on a configured GUI of the client device to start the audio-video conference presentation, wherein the initiate topic object sequence set event may be transmitted from the client device 101A-101N to the shared dynamic collaborative presentation progression interface server 210 and received as an initiate topic object sequence set event. The initiate topic object sequence set event received by the shared dynamic collaborative presentation progression interface server 210 and transmitted from the client device 101A-101N includes, in some embodiments, various metadata relating to the initiate topic object sequence set event request by the first user via the client device 101A-101N. By way of non-limiting example, the initiate topic object sequence set event may be shown as a configured GUI comprising an electronically selectable "button" such as the ones shown as 825 in FIG. 8 (a button which may read, "Get Started'), 1005 in FIG. 10 (a button which may read, "Get Started"), and/or 1310 in FIG. 13 (a button which may read, "Start Meeting").

As shown by operation 425, the apparatus (e.g., collaborative contextual summary interface server 210) includes means, such as processor 202, input/output circuitry 203, communications circuitry 204, collaborative contextual summary interface circuitry 205 and/or the like, for identifying a first topic object of the topic object sequence set as an active topic object. In some embodiments, the identification of a first topic object of the topic object sequence set as an active topic object may occur in response to the shared dynamic collaborative presentation progression interface server 210 receiving the initiate topic object sequence set event. In some embodiments, one or more users of the participating client devices may interact with a client device 101A-101N that is in network communication with the shared dynamic collaborative presentation progression interface server 210 to generate a topic object sequence set comprising one or more topic objects. By way of non-limiting example, one or more users of the participating client devices may interact with the shared dynamic collaborative presentation progression interface server 210 via a network to generate a topic object sequence set comprising one or more topic objects, such as an agenda of the audio-video conference presentation. In some embodiments, the one or more users of the participating client devices in association with the shared dynamic collaborative presentation progression interface server 210 may select and/or otherwise identify a specific order of the topic objects in the topic object sequence set (e.g., a specified order of discussion for each of the topic objects associated with the topic object sequence set). In some embodiments, such selection and/or identification occurs prior to the audio-video conference presentation. By way of non-limiting example, the identification of a first topic object of the topic object sequence set as an active topic object may comprise selecting a topic object of the topic object sequence set which was previously identified as a first topic object for the audio-video conference presentation (e.g., a first topic object for discussion in the audio-video conference presentation) prior to the start of the audio-video conference presentation by one or more users collaborating to generate such topic object sequence set (e.g., agenda). Additionally or alternatively, in still further embodiments, such selection and/or identification occurs during the audio-video conference presentation. By way of non-limiting example, the identification of a first topic object of the topic object sequence set as an active topic object may comprise selecting a topic object of the topic object sequence set as a first topic object for the audio-video conference presentation (e.g., a first topic object for discussion in the audio-video conference presentation) in real-time during the audio-video conference presentation by one or more users participating in the audio-video conference presentation. In some embodiments, a timer is activated by the apparatus (e.g., collaborative contextual summary interface server 210) in association with identifying the first topic object as the active topic object at operation 425.

In some embodiments, once a topic object sequence set has been selected by a user by the transmission of the initiate topic object sequence set event to the shared dynamic collaborative presentation progression interface server 210, and once the topic object sequence set has begun (e.g., once the audio-video conference presentation has started), one or more participating users may select a different topic object sequence set (e.g., transmit a different initiate topic object sequence set event to the shared dynamic collaborative presentation progression interface server 210) in real-time and during the current topic object sequence set to restart the first-selected topic object sequence set to a different and/or second topic object sequence set.

In some embodiments, the active topic object of the topic object sequence set may comprise a visual emphasis element indicating the active topic object as the current topic of the topic object sequence set in the audio-video conference presentation. By way of non-limiting example, the active topic object may be shown as a configured GUI comprising an element of shared dynamic collaborative presentation progression interface as element 1115 in FIG. 11 (the topic object which reads, "The First Ivy User" which is currently being discussed), 1405 of FIG. 14 (topic object which reads, "Intros" which is currently being discussed), and/or 1510 of FIG. 15 (topic object which reads, "Person 2 Turn" which is currently being discussed).

Additionally or alternatively, in some embodiments, the visual representation of the first topic object and other topic objects of the topic object sequence set may comprise a selectable link. In some embodiments, a user may select the link associated with the topic objects and, in response to the selected link, the participating client device may transmit a request comprising a topic object identifier to the shared dynamic collaborative presentation progression interface server 210 to access a resource object associated with the selected topic object and its topic object identifier. In some embodiments, the shared dynamic collaborative presentation progression interface server 210 may query the shared dynamic collaborative presentation progression interface repository 215 to access the resource object associated with the topic object identifier and may transmit the resource object of the topic object identifier (e.g., by way of the shared dynamic collaborative presentation progression interface server 215) back to the participating client device for rendering on a configured GUI of the participating client device. By way of non-limiting example, such a resource object may comprise presentation slides, reading materials, webpages, etc. associated with the audio-video conference presentation for the specified topic object of the topic object identifier.

Additionally or alternatively, in some embodiments wherein a second topic object is associated with a second participating user identifier, the apparatus (e.g., collaborative contextual summary interface server 210) includes means, such as processor 202, input/output circuitry 203, communications circuitry 204, collaborative contextual summary interface circuitry 205 and/or the like, for, in response and/or in addition to identifying the first topic object of the topic object sequence set as the active topic object, transmitting a display upcoming presenter notification event to the participating client device associated with the second participating user identifier, such display upcoming presenter notification event comprising instructions for configuring the GUI to indicate to the specific user of the participating client device (e.g., second participating user) that the topic object associated with the user is upcoming in the topic object sequence set (e.g., to get ready to present soon). In some embodiments, a participating user device associated with the active topic object (e.g., the participating user of the active topic object) may receive a notification event similar to the upcoming presentation notification event, but wherein the notification event of the participating user of the active topic object may be notified that a target time of the active topic object is almost satisfied. By way of non-limiting example, a participating client device may receive a notification event comprising instructions for configuring the GUI to indicate to the participating user of the active topic object (e.g., a first participating user) that the topic object associated with the participating user has a target time that has almost been met, satisfied, or exceeded. In some embodiments, the participating client device may receive the notification event and configure the GUI of the participating user device at user-specified time intervals leading up to the end of the target time (e.g., 2 mins before target time is met, 1 minute before target time is met, 30 seconds before target time is met, and other such predefined time periods). In some embodiments, the participating client device may receive the notification event and configure the GUI of the participating user device at programmatically-specified time intervals leading up to the target time (e.g., 2 mins before target time is met, 1 minute before target time is met, 30 seconds before target time is met, and other such predefined time periods). By way of example, and in some embodiments, the participating client device may receive the notification event and configure the GUI of the participating user device associated with the active topic object at the same time the upcoming presenter notification event configures and/or is presented on the participating user device of the sequential (e.g., next) topic object.

In some embodiments, the target time associated with each of the topic objects of a topic object sequences set and/or a facilitation topic object may be programmatically selected and/or manually generated by one or more participating users of the shared dynamic collaborative presentation progression interface. In some embodiments, the shared dynamic collaborative presentation progression interface server 210 may programmatically generate the target time for each of the topic objects (e.g., in a topic object sequence set and/or facilitation topic object) based upon one or more identifiers, such as user identifier(s), agenda object identifier(s), topic object identifier(s), and/or the like. By way of non-limiting example, the shared dynamic collaborative presentation progression interface may programmatically select and/or generate a target time for each of the topic objects by analyzing to the amount (e.g., number) of participating users (e.g., by referring to the participating user identifiers) and/or the amount of topic objects within the topic object sequence set to determine how much time may be used for each topic object associated with each of the participating user identifiers (e.g., for an audio-video conference presentation scheduled for one hour and with 6 topic objects comprising two participating user identifiers per topic object, the shared dynamic collaborative presentation progression interface server 210 may generate a target time for each topic object as 10 minutes. By way of non-limiting example, and in further reference to the example described hereinabove, if 3 topic objects comprising 2 participating user devices for the identified for the first two topic objects and 4 participating user devices are identified for the last topic object, the shared dynamic collaborative presentation progression interface server 210 may indicate a target time for the first two topics as 15 minutes and 30 minutes for the last topic objects such that the target times are determined based on a ratio of topic objects to participating user devices.

As shown by operation 430, the apparatus (e.g., collaborative contextual summary interface server 210) includes means, such as processor 202, input/output circuitry 203, communications circuitry 204, collaborative contextual summary interface circuitry 205 and/or the like, for updating the shared dynamic collaborative presentation progression interface to cause rendering of at least an active visual emphasis element in association with a visual representation the first topic object. In some embodiments, the shared dynamic collaborative presentation progression interface rendered on each of the client devices 101A-101N in association with the audio-video conference presentation may comprise an update of the shared dynamic collaborative presentation progression interface by rendering the first topic object of the topic object sequence set as an active topic object on each of the one or more client devices (e.g., by configured the GUI of each of the one or more client devices to indicate the active topic object). By way of non-limiting example, the shared dynamic collaborative presentation progression interface may highlight or indicate that the first topic object of the one or more topic objects within a topic object sequence set is the active topic object such as that shown as element 1115 in FIG. 11 (the topic object of "The First Ivy User," wherein the GUI is configured to show the topic object the only topic covered by stating "0 topic covered"), 1405 of FIG. 14 (topic object of "Intros," wherein the GUI is configured to show the "Intros" as the only topic object to be discussed and/or currently being discussed), and/or 1510 of FIG. 15 (topic object "Person 2 Turn," wherein the GUI is configured to show "Person 2 Turn" in a different element indicating a special status which may comprise a box around the topic object). Additionally or alternatively, in some embodiments, the visual representation of the first topic object (e.g., active topic object) includes a visual indication of a time spent/associated with the topic object (e.g., elapsed time object) being the active topic object. In still further embodiments, the elapsed time object corresponds to a timer activated by the apparatus (e.g., collaborative contextual summary interface server 210) in association with identifying the first topic object as the active topic object at operation 425. Additionally or alternatively, in some embodiments, wherein a first participating user identifier is associated with the first topic object, the visual representation of the first topic object (e.g., active topic object) includes display of a visual representation of the first participating user identifier in association with the visual representation of the first topic object. In some embodiments, the active topic object may be indicated by an element configured on the GUI of one or more participating user devices by the shared dynamic collaborative presentation progression interface to show only the active topic object within a topic object sequence set. By way of non-limiting example, the configured GUI showing only the active topic object topic object sequence set may be shown by element 1420 of FIG. 14, which may indicate the active topic object (e.g., an introduction of Luis) within an element comprising a pop-up, square, colored box/square, itemized list comprising the active topic object, and/or other such elements indicating a single topic object as an active topic object.

In some embodiments, the shared dynamic collaborative presentation progression interface comprises display of only the active topic object. Alternatively, the shared dynamic collaborative presentation progression interface comprises a visual representation of one or more other topic objects, such as the topic object sequence set FIG. 4B is a signal diagram of an example data flow represented by the operations depicted in FIG. 4A. That is, FIG. 4B illustrates an example signal diagram illustrating data flow interactions between a shared dynamic collaborative presentation progression interface server, a client device, and a repository, when generating a shared dynamic collaborative presentation progression interface in accordance with one embodiment. FIG. 4B is described as being performed by a shared dynamic collaborative presentation progression interface server 210, a shared dynamic collaborative presentation progression interface repository 215, and a client device 101A. These may be similar to those previously discussed with regards to FIG. 1.

With reference to FIG. 5, a flowchart is provided broadly illustrating a series of operations or process blocks for generating and transmitting a transition topic object sequence instructions set for updating the shared dynamic collaborative presentation progression interface in association with an audio-video conferencing interface service, in accordance with some example embodiments of the present disclosure. The operations illustrated in FIG. 5 may, for example, be performed by, with the assistance of, and/or under the control of one or more apparatuses, such as shared dynamic collaborative presentation progression interface server 210, as described above. In this regard, performance of the operations may invoke one or more of memory 201, processor 202, input/output circuitry 203, communications circuitry 204, and/or collaborative contextual summary interface circuitry 205. Certain operations may be considered optional, as indicated by the dashed lines.

As shown in operation 505, the apparatus (e.g., shared dynamic collaborative presentation progression interface server 210) includes means, such as processor 202, input/output circuitry 203, communications circuitry 204, and/or the like, for receiving a topic object progression event from at least one participating client device of the plurality of participating client devices. In some embodiments, the topic object progression event may be received by the shared dynamic collaborative presentation progression interface server 210 from one or more client devices 101A-101N, wherein one or more requests and or indications by user(s) of participating client device(s) may comprise electronic indications transmitted to the shared dynamic collaborative presentation progression interface server 210 to proceed to the next topic object of the topic object sequence set. By way of non-limiting example, the shared dynamic collaborative presentation progression interface used to configure the GUI of a client device 101A-101N may comprise electronically selectable elements (e.g., topic object progression interface component) for a user of the client device 101A-101N to transition to next topic via a topic object progression event such as element 1120 of FIG. 11 (e.g., a button which may read, "Next Topic").

In some embodiments, one or more participating users (e.g., by one or more participating client devices) may transmit one or more requests to the shared dynamic collaborative presentation progression interface server 210 to add one or more topics (e.g., topic objects) to the topic object sequence set during an audio-video conference presentation. By way of non-limiting example, a participating user may select an interface element to transmit to the shared dynamic collaborative presentation progression interface a request to add a new topic to a topic object sequence set while the topic object sequence set is in progression during an audio-video conference presentation. Additionally or alternatively, in some embodiments, a participating user of the shared dynamic collaborative presentation progression interface may edit one or more topic objects (e.g., an active topic object and/or one or more topic objects not yet identified as an active topic object or a completed topic object) in the topic object sequence set when the topic object sequence set is in progression (e.g., during an audio-video conference presentation).

In some embodiments, the shared dynamic collaborative presentation progression interface server 210 may automatically continue to the next topic object of the topic object sequence set once some predetermined rule has been satisfied, such as a predetermined time period for the current topic object has been satisfied. In some embodiments, the shared dynamic collaborative presentation progression interface server 210 may continue to the next topic object of the topic object sequence set based upon a request received from the one or more participating client devices indicating a request by one or more participating users to provide one or more new rules to control the topic object sequence set and subsequent topic objects. By way of non-limiting example, a participating user may request, by a participating client device, may transmit at least one request and/or vote to give a topic object (1) more time in the topic object sequence set, (2) to continue to the next topic object, and/or (3) an impartial request to indicate that the participating user would allow more time (e.g., option (1)) or will continue to the next topic object (e.g., option (2)). In some embodiments, the requests by the participating users may be used by the shared dynamic collaborative presentation progression interface server 210 to determine whether to continue to the next topic object of the topic object sequence set by tallying and/or counting the requests by the participating users (e.g., if more users select to have more time, then the current active topic object may continue; if more users select to continue to the next topic object, then the shared dynamic collaborative presentation progression interface may indicate the next topic object is the active topic object; if more users select option (3) and is impartial, then the shared dynamic collaborative presentation progression interface may be pre-programmed to stay on the current topic object or the shared dynamic collaborative presentation progression interface may be pre-programmed to continue to the next topic object). In some embodiments, such a predetermined time period for the topic objects of the topic object sequence set may be determined by one or more users of the participating client devices, wherein the one or more users may select (e.g., from a menu of predetermined time period of the shared dynamic collaborative presentation progression interface) or may generate (e.g., by inputting into the shared dynamic collaborative presentation progression interface a specified time period).

In some embodiments, such a predetermined time period for each topic object may be used by the shared dynamic collaborative presentation progression interface to indicate a time spent (e.g., elapsed time object) on the one or more topic objects of the topic object sequence set in order to indicate a total time elapsed on the topic object sequence set. In some embodiments, the total time elapsed on the topic object sequence set may be updated after each topic object has been completed (e.g., completed topic object), such that the total time elapsed is only updated after a topic object previously identified as an active topic object is de-identified as the topic object and identified as a completed topic object (i.e., the topic object comprises a completed topic object identifier). By way of non-limiting example, the shared dynamic collaborative presentation progression interface used to configure a GUI of one or more client devices 101A-101N may comprise an element indicating a total time elapsed such as 820 of FIG. 8, 1025 of FIG. 10, 1105 of FIG. 11, and/or 1125 of FIG. 11. By way of non-limiting example, the shared dynamic collaborative presentation progression interface used to configure the GUI of one or more client devices 101A-101N may comprise an elapsed time for each topic object of the topic object sequence set such as elements 1110 of FIG. 11 (indicating "0:02" or two seconds have elapsed in the current and/or active topic object), 1405 of FIG. 14 and 1505 of FIG. 15 (both indicating "0:12" or twelve seconds have elapsed in the current and/or active topic object), 1610 of FIG. 16 (indicating "4:40" or four minutes and forty seconds have elapsed of the first topic object), 1620 (indicating "13:08" or thirteen minutes and eight seconds have elapsed of the second topic object), 1635 of FIG. 16 (indicating "15:32" or fifteen minutes and thirty-two seconds have elapsed of the third topic object), 1650 of FIG. 16 (indicating "11:21" or eleven minutes and twenty-one seconds have elapsed of the fourth topic object), 1665 of FIG. 16 (indicating "8:40" or eight minutes forty seconds have elapsed of the fifth topic object), or 1675 of FIG. 16 (indicating "2:45" or two minutes and forty-five seconds have elapsed of the sixth topic object).

In some embodiments, each topic object of the topic object sequence set may comprise, be associated with, and/or be assigned a target time for each of the topic objects to be discussed. For example, each of the topic objects may comprise target time for the topic object to be identified as an active topic object. Additionally or alternatively, in some embodiments, the shared dynamic collaborative presentation progression interface server 210 causes display of a visual representation of the respective target time in association with each topic object that is not associated with a completed topic object identifier or an active topic object identifier.

Additionally or alternatively, in some embodiments, visual emphasis elements are employed as a contextually relevant coloring scheme to visually indicate a comparison of the elapsed time to the respective target time of such topic object. By way of non-limiting example, as a topic object is identified as active (e.g., discussed), an elapsed timer may run and as the elapsed timer on the shared dynamic collaborative presentation progression interface runs, a visual emphasis element may be assigned and/or added to an elapsed time object to indicate if the elapsed time object exceeds the target time. For example, if the elapsed time exceeds the target time, a visual emphasis element may indicate that the time has run for that specific topic object and the associated presenter must finish, such as a color highlight of the elapsed time object like the color red. For example, and if the elapsed time object does not exceed or meets the target time, a visual emphasis element may indicate that the target time has not been met, such as by color highlighting the elapsed time object the color green. Additionally or alternatively, with respect to completed topic objects, in some embodiments, the shared dynamic collaborative presentation progression interface server 210 determines an elapsed time for each completed topic object and causes display of a visual representation of the respective elapsed time in association with each completed topic object. The shared dynamic collaborative presentation progression interface server 210 further determines a visual emphasis element for each completed topic object based at least in part on the respective target time, wherein each visual emphasis element employs a contextually relevant coloring scheme to visually indicate a comparison of the elapsed time for the completed topic object to the respective target time of each completed topic object and applies the determined visual emphasis elements to the visual representations of the respective elapsed time in association with each completed topic object. In some embodiments, the visual emphasis element of an elapsed time object may change and/or be determined based upon a target time object and the associated difference between the target time object and the elapsed time object. By way of non-limiting example, as an elapsed time object runs and/or progresses it may comprise a visual emphasis element of a white color (e.g., the elapsed time object—numbers—may comprise the color white); as an elapsed time object runs and/or progresses closer to the target time object (e.g., is within 5 minutes, 4 minutes, 3 minutes, 2 minutes, 1 minute, or less than a minute to satisfying the target time object), the elapsed time object may be indicated with a visual emphasis element to warn one or more participating users (e.g., the elapsed time object—its numbers—may comprise the color yellow or orange); and as the elapsed time object satisfies and/or runs longer than the target time object, the elapsed time object may be indicated with a visual emphasis element to warn participating users that the target time has been satisfied (e.g., the elapsed time object—its numbers—may comprise the color red). In some embodiments, the determination of the visual emphasis element and the point at which the visual emphasis element may change (e.g., from white to yellow and from yellow/orange to red) may be manually programmed by a participating user and/or may be programmatically selected by the shared dynamic collaborative presentation progression interface server 210.

As shown in operation 510, the apparatus (e.g., shared dynamic collaborative presentation progression interface server 210) includes means, such as processor 202, input/output circuitry 203, communications circuitry 204, and/or the like, for identifying the first topic object as the active topic object. In some embodiments, the de-identification of topic object as an active topic object may comprise the dissociation of an active topic object identifier from the first topic object, the association of the first topic object with a completed topic object identifier (e.g., the identification of the de-identified topic object as a completed topic object), and, in some further embodiments, storage of an elapsed time object (e.g., such as described with respect to operation 425) that coincides with the receipt of the topic object progression event in association with the completed first topic object. By way of non-limiting example, the de-identification of the topic object may comprise the shared dynamic collaborative presentation progression interface server 210 moving the active visual emphasis element to a new active topic object (e.g., removing an active visual emphasis element from the de-identified active topic object and applying an active visual emphasis element to a different topic object, e.g., as discussed in further detail below with respect to operations 515 and 525).

In some embodiments, once a topic object has been identified as a completed topic object, an annotation summary of the completed topic object may be displayed on the one or more client devices, which may comprise the participating client devices, wherein the annotation summary may comprise the title of each topic object, a participating user identifier to show the responsible participating user (e.g., such as an icon, username, full name, picture graphic, and other such identifying objects), notes for each topic object that may have been uploaded by one or more users of the participating client devices, elapsed time objects, and/or visual emphasis elements. In some embodiments, the annotation summary may comprise a summary listing of content captured in association with the first topic object during the period of time the first topic object was identified as the active topic object, such as content to describe the content of the topic object discussed and/or presented in the audio-video conference presentation during the time at which the topic object was identified as an active topic object. By way of non-limiting example, the summary listing of content may comprise summaries of the content discussed at the time the topic object was identified as active (e.g., during the period of time the topic object was identified as the active topic object), such as text input by one or more users of the participating client devices to disclose each user's interpretation of the active topic object.

As shown in operation 515, the apparatus (e.g., shared dynamic collaborative presentation progression interface server 210) includes means, such as processor 202, input/output circuitry 203, communications circuitry 204, and/or the like, for identifying a second topic object as the active topic object in the topic object sequence set as the active topic object. In some embodiments, the identification of a second topic object as an active topic object may comprise the identification of the de-identified first topic object, of operation 510, as a completed topic object. In some embodiments, the identification of an active topic object to a subsequent topic object of the topic object sequence set may comprise identifying any topic object within the topic object sequence set as active. For example, in some embodiments, identifying a topic object (e.g., the second topic object in the topic object sequence set) as the active topic object comprises associating the selected topic object (e.g., the second topic object) with an active topic object identifier.

In some embodiments, the active topic object may be indicated by an active visual emphasis element. By way of non-limiting example, such an active visual emphasis element may be shown as element 1510 of FIG. 15 which may indicate an active topic object using one or more visual emphasis element types (e.g., by a box like that seen at 1510; by a highlight; by a shading around the active topic object; by a formatting indication such as italicize, bolding, underling, larger font size; and other such indicators of an active topic object).

As shown in operation 520, the apparatus (e.g., shared dynamic collaborative presentation progression interface server 210) includes means, such as processor 202, input/output circuitry 203, communications circuitry 204, and/or the like, for generating a transition topic object sequence instructions set based on the topic object progression event. In some embodiments, the shared dynamic collaborative presentation progression interface server 210 may transmit one or more instructions to one or more client devices 101A-101N, including the one or more participating client devices, to configure the GUI of each client device to update the interfaces of the client devices to indicate a next topic object. Additionally or alternatively, in some embodiments, wherein a second participating user identifier is associated with the second topic object, the transition topic object sequence instructions set include one or more instructions fore displaying a visual representation of the second topic object (e.g., active topic object) with a visual representation of the second participating user identifier in association with the visual representation of the second topic object As shown in operation 525, the apparatus (e.g., shared dynamic collaborative presentation progression interface server 210) includes means, such as processor 202, input/output circuitry 203, communications circuitry 204, and/or the like, for outputting the transition topic object sequence instruction set to the plurality of participating client devices for updating the shared dynamic collaborative presentation progression interface. In some embodiments, the indication of the next topic object by way of the transition topic object sequence instructions set may comprise indicating the next topic object using a visual emphasis element. By way of non-limiting example, a visual emphasis element to indicate the next topic object may comprise a general statement of the amount of topic objects left to be discussed such as the element 1130 in FIG. 11 (indicating "6 more topics" in the topic object sequence set). By way of non-limiting example, a visual emphasis element to indicate the next topic object may also comprise a list of the upcoming topic objects for discussion and/or a list of presenters and/or users associated with the participating client devices who are assigned to each topic object of the upcoming topic objects, such as that shown in elements 1515, 1520, and 1525 of FIG. 15 (indicating the upcoming or "Up Next" presenters as "Her," "You," and "Him"). Each of these visual emphasis elements used to indicate the next topic object or plurality of next topic objects (which may also comprise one or more presenters assigned to each topic object) may be used by the shared dynamic collaborative presentation progression interface server 210 to configure the GUI of the one or more client devices 101A-101N, further comprising the one or more participating client devices.

In some embodiments, updating the shared dynamic collaborative presentation progression interface comprises causing stopping of the rendering of the active visual emphasis element in association with the visual representation of the first topic object and causing rendering of the active visual emphasis element in association with the visual representation of the second topic object. By way of non-limiting example, such an active visual emphasis element may be shown as element 1510 of FIG. 15. Additionally or alternatively, in association with causing stopping of the rendering of the active visual emphasis element with respect to the visual representation of the first topic object, in some embodiments, the apparatus (shared dynamic collaborative presentation progression interface server 210) causes display of a completion indicator in association with the visual representation of the first topic object. By way of further non-limiting example, the updating of shared dynamic collaborative presentation progression interface comprising the stopping of the rendering of the active visual emphasis element in association with the first topic object may further comprise the transmission of an updated shared dynamic collaborative presentation progression interface to configure the GUI of one or more client devices to indicate a second topic object as the active topic object by one or more visual emphasis elements. Such a transmission of the shared dynamic collaborative presentation progression interface may overwrite the previous transmission of the shared dynamic collaborative presentation progression interface (e.g., comprising an active visual emphasis element of the [first] topic object) on the client device 101A-101N.

With reference to FIG. 6, a flowchart is provided broadly illustrating a series of operations or process blocks for determining a presenting order and causing display of visual representations of each of the participating user identifiers in accordance with such determined order in an audio-video conference presentation, in accordance with some example embodiments of the present disclosure. The operations illustrated in FIG. 6 may, for example, be performed by, with the assistance of, and/or under the control of one or more apparatuses, such as shared dynamic collaborative presentation progression interface server 210, as described above. In this regard, performance of the operations may invoke one or more of memory 201, processor 202, input/output circuitry 203, communications circuitry 204, and/or collaborative contextual summary interface circuitry 205. Certain operations may be considered optional, as indicated by the dashed lines.

As shown in operation 605, the apparatus (e.g., shared dynamic collaborative presentation progression interface server 210) includes means, such as processor 202, input/output circuitry 203, communications circuitry 204, and/or the like, for identifying a first participating user identifier of the plurality of participating user identifiers associated with the first topic object. In some embodiments, the identification of a first participating user identifier in the plurality of participating user identifiers associated with the first topic object may be performed in response to the shared dynamic collaborative presentation progression interface server 210 receiving an identify random presentation order event. In some embodiments, a second topic object may be identified as an active topic object and a second participating user identifier may be identified by the shared dynamic collaborative presentation progression interface server 210.

In some embodiments, the identify random presentation order event may comprise an electronic request transmitted from one or more participating client devices and/or an administrative client device (not pictured, but which comprises the same circuitry and capabilities as that shown in apparatus 300), wherein the administrative client device may be configured to access certain specifications of the audio-video conference presentation that other client devices, or participating client devices, cannot. In some non-limiting examples, a user of the one or more client devices (e.g., a user associated with a participating client devices and/or a user associated with an administrative device) may select via a configured GUI of the client device (e.g., configured by the shared dynamic collaborative presentation progression interface) to select a random presentation order event. In some embodiments, the random presentation order event may cause the topic object sequence set to be configured in a randomized order. For example, a randomized order may be caused by a random number generator or pseudo-random number generator. In some embodiments, the random presentation order event may cause the topic object sequence set to be configured in a randomized order based on the order of the participating users of the participating client devices joining the audio-video conference presentation (e.g., order by which the participating users joined the meeting). In some embodiments, the random presentation order event may cause the topic object sequence set to be configured in a randomized order based on the one or more time zones associated with the participating client devices. By way of non-limiting example, the one or more time zones of the participating client devices may be used to determine the topic object sequence set in a randomized order as an order of time zones for the participating client devices, such as a randomized order based on earlier time zones (e.g., a time zone comprising an earlier time (e.g., 10 am CST) may indicate the participating user associated with the earlier time zone will go before a participating user associated with a later time zone (e.g., 11 am EST)). By way of non-limiting example, the one or more time zones of the participating client devices may be used to determine the topic object sequence set in a randomized order as an order of time zones for the participating client devices, such as a an order of time zones in a later time zone (e.g., a participating user in a later time zone such as 12 pm CST may go before a participating user in an earlier time zone such as 11 PST). In some embodiments, once the random presentation order event is selected by a user of the one or more client devices, a request may be transmitted to the shared dynamic collaborative presentation progression interface server 210 comprising the random presentation order event. The shared dynamic collaborative presentation progression interface server 210 may collect the random presentation order event and identify said random presentation order event as instructions to randomize the topic objects, of the topic object sequence set, and/or presenters of the audio-video conference presentation and transmit the randomized topic objects to one or more users of the client devices as configured GUI. By way of non-limiting example, a random presentation order event may be indicated to a user via an electronically selectable element, such as "button" configured on the client device of the user, like that shown 1410 of FIG. 14 (indicating a selectable element which reads, "Random order").

As shown in operation 610, the apparatus (e.g., shared dynamic collaborative presentation progression interface server 210) includes means, such as processor 202, input/output circuitry 203, communications circuitry 204, and/or the like, to cause display of a visual representation of the first participating user identifier in association with the visual representation of the first topic object. In some embodiments, the display of the visual representation of the first participating user identifier in association with the visual representation of the first topic object may be in response to the shared dynamic collaborative presentation progression interface server 210 transmitting the shared dynamic collaborative presentation progression interface for configuring of a GUI on one or more client devices.

In some embodiments, the shared dynamic collaborative presentation progression interface server 210 may transmit one or more interface elements (e.g., a shared dynamic collaborative presentation progression interface) to one or more client devices, including participating client devices, in order to display a visual representation of the first participating user identifier in association with the first topic object. By way of non-limiting example, a visual representation of the first participating user identifier may comprise an identifier of a user of a participating client device such as a name of the user, a username of the user, an icon or graphic associated with the user, a picture graphic (e.g., a picture of the user), and/or other identifying elements of the user. By way of non-limiting example, a random presentation order event may be indicated to a user via an electronically selectable element, such as "button" configured on the client device of the user, like that shown in 905 of FIG. 9 (indicating a participating user's name); 1205 of FIG. 12 (indicating a picture graphic of a user associated with topic object 1220), 1305 of FIG. 13 (indicating a plurality of picture graphics associated with a plurality of users of the audio-video presentation service); 1415 of FIG. 14 (indicating a picture graphic of a participating user); and 1615, 1630, 1645, and 1660 of FIG. 16.

As shown in operation 615, the apparatus (e.g., shared dynamic collaborative presentation progression interface server 210) includes means, such as processor 202, input/output circuitry 203, communications circuitry 204, and/or the like, to determine a presenting order of the remaining participating user identifiers associated with the first topic object. In some embodiments, the shared dynamic collaborative presentation progression interface server 210 determines a randomized presenting order (e.g., of topic objects and/or participating user identifiers) using one or more randomizer methods. In some embodiments, such randomizer methods comprise at least one of a random number generator or a pseudo-random number generator. In some embodiments, the entire random presenting order is defined at once. Additionally or alternatively, a randomizer method is used anew at each position of the generated presentation order.

As shown in operation 620, the apparatus (e.g., shared dynamic collaborative presentation progression interface server 210) includes means, such as processor 202, input/output circuitry 203, communications circuitry 204, and/or the like, to cause the display of a visual representation of each of the remaining participating user identifiers in the determined order in association with an upcoming presenter interface element in the visual representation of the first topic object. In some embodiments, once the presentation order for the one or more participating user identifiers are determined by the shared dynamic collaborative presentation progression interface server 210, the shared dynamic collaborative presentation progression interface server 210 may transmit an updated shared dynamic collaborative presentation progression interface and/or an instructions set for updating the shared dynamic collaborative presentation progression interface to include visual representation(s) of the remaining participating user identifiers in such defined order. By way of non-limiting example, the shared dynamic collaborative presentation progression interface used to configure the GUI of the one or more participating client devices may be shown as interface 1500 of FIG. 15, which may further comprise a visual representation list of the upcoming participating user identifiers (e.g., 1515, 1520, 1525, etc.) in the determined presentation order.

Additionally or alternatively, in some embodiments, the presenting order of the participating user identifiers in association with the topic object sequence set is defined by the topic object sequence set. In some embodiments, the topic object sequence set may be identified and/or generated by one or more users of the participating client devices (e.g., prior to and/or during the audio-video conference presentation). In some embodiments, the topic object sequence set may comprise a user interacting with a configured GUI (e.g., configured by the shared dynamic collaborative presentation progression interface server 210) to indicate, assign, and/or request one or more user identifiers for each of the one or more topic objects. By way of non-limiting example, the indication, assignment, and/or request by one or more users of the participating client device may be indicated by an electronically selectable element of the configured GUI (e.g., configured by the shared dynamic collaborative presentation progression interface server 210) of the participating client device, such as that shown at 1015 at FIG. 10 (indicating a selectable indicia, such as a button which reads, "Assign owner" for the one or more topic objects of list 1010). In some embodiments, and in response to the indication, assignment, and/or request by one or more users of the participating client devices, the shared dynamic collaborative presentation progression interface server 210 may receive an assigned user identifier for each of the one or more topic objects of the topic object sequence set from the one or more participating client devices. In some embodiments, such indication, assignment, and/or request is received prior to the start of the audio-video conference presentation. Additionally or alternatively, such indication, assignment, and/or request is received in real-time during the audio-video conference presentation.

In some embodiments, the active audio-video conference presentation is associated with a presentation identifier and the topic object sequence set is associated with the presentation identifier. For example, in some embodiments, prior to the start of the audio-video conference presentation, a topic object sequence set is defined by one or more participating users and associated with the audio-video conference presentation such that the topic object sequence set is automatically retrieved, displayed with, and/or associated with the audio-video conference presentation at the start of the audio-video conference presentation. In some embodiments, such association is accomplished by associating each with the unique presentation identifier. In such embodiments, no manual selection from a user is required during the audio-video conference presentation to identify the associated topic object sequence set (e.g., agenda). Additionally or alternatively, one or more participating users may manually select an agenda (e.g., topic object sequence set) in real-time at the time of the audio-video conference presentation. With reference to FIG. 7, a flowchart is provided broadly illustrating another series of operations or process blocks for retrieving a topic object sequence set based on an agenda object identifier identified in an agenda object selection request from a participating client device, in accordance with some example embodiments of the present disclosure. The operations illustrated in FIG. 7 may, for example, be performed by, with the assistance of, and/or under the control of one or more apparatuses, such as shared dynamic collaborative presentation progression interface server 210, as described above. In this regard, performance of the operations may invoke one or more of memory 201, processor 202, input/output circuitry 203, communications circuitry 204, and/or collaborative contextual summary interface circuitry 205. Certain operations may be considered optional, as indicated by the dashed lines.

As shown in operation 705, the apparatus (e.g., shared dynamic collaborative presentation progression interface server 210) includes means, such as processor 202, input/output circuitry 203, communications circuitry 204, and/or the like, for receiving a display collaborative conference presentation interface request, wherein the display collaborative conference presentation interface request comprises a participating user identifier. In some embodiments, the display collaborative conference presentation interface request may be transmitted to the shared dynamic collaborative presentation progression interface server 210 from a participating client device by a specified user of the participating client device. In some embodiments, the display collaborative conference presentation interface request may be transmitted to a schedule API such as a calendar service (e.g., from an email service such as Outlook®, Gmail®, Yahoo®), business collaboration software tools (e.g., Slack® or other such business collaboration tools) from a participating client device by a specified user of the participating client device to access and/or receive one or more sequence topic object sets. In some embodiments, the display collaborative conference presentation interface request may comprise a request (e.g., electronic request) and/or indication from the user of the participating client device to configure the GUI of the participating client device to show one or more sequence topic object sets generated by the user of the participating client device. By way of non-limiting example, Alice may generate a plurality of sequence topic object sets for a plurality of audio-video conference presentations, and this plurality of sequence topic object sets may be stored locally on the participating client device and/or on the shared dynamic collaborative presentation progression interface server 210. By way of non-limiting example, Alice may transmit a request to the shared dynamic collaborative presentation progression interface server 210 to display the plurality of sequence topic object sets on the participating client device by transmitting a display collaborative conference presentation interface request. In some embodiments, the display collaborative conference presentation interface request may comprise a participating user identifier (e.g., a participating user identifier identifying Alice as the participating user transmitting the display collaborative conference presentation interface request).

As shown in operation 710, the apparatus (e.g., shared dynamic collaborative presentation progression interface server 210) includes means, such as processor 202, input/output circuitry 203, communications circuitry 204, and/or the like, for querying a repository for agenda objects associated with the user identifier. In some embodiments, and in response to receiving the display collaborative presentation interface request, the shared dynamic collaborative presentation progression interface server 210 may query a repository (e.g., a shared dynamic collaborative presentation progression interface repository 215) for the topic object sequence sets associated with the participating user identifier received and identified in operation 705. In some embodiments, the shared dynamic collaborative presentation progression interface repository 215 may store the one or more topic object sequence sets of one or more participating users of the participating user devices which may be in communication with the collaborative presentation progression interface management system 200 and/or the a shared dynamic collaborative presentation progression interface server 210. By way of non-limiting example, each of the one or more topic object sequence sets may be stored in the a shared dynamic collaborative presentation progression interface repository 215 in specific storage subsystems (e.g., sub-repositories) which may each be associated with a specific participating user identifier like that received in operation 705. The shared dynamic collaborative presentation progression interface server 210 may query the a shared dynamic collaborative presentation progression interface repository 215 to locate the one or more topic object sequence sets associated with a particular participating user identifier.

As shown in operation 715, the apparatus (e.g., shared dynamic collaborative presentation progression interface server 210) includes means, such as processor 202, input/output circuitry 203, communications circuitry 204, and/or the like, for causing display of a collaborative conference presentation interface to the participating client device associated with the participating user identifier in association with the active audio-video conference presentation. In some embodiments, the collaborative conference presentation interface may comprise a rendered listing of agenda objects returned by the query. By way of non-limiting example, the rendered listing of agenda objects may include a title for each for each of the topic object sequence sets generated and/or created by the participating user associated with the participating user identifier. For example, a participating user may generate a title of a topic object sequence set along with the each topic object of the topic object sequence set in one or more interfaces transmitted by the shared dynamic collaborative presentation progression interface server 210 to the participating client device. Such an example interface may be shown as interface 800 of FIG. 8, which may comprise title 805 (e.g., a topic object sequence set description). In some embodiments, the example interface to generate the topic object sequence set may also comprise fillable content on the interface (e.g., fillable by a participating user) to include the one or more topic objects of the topic object sequence set, such as the list of topic objects in list 815, which may be identified generally as the topics 810 covered by the specific topic object sequence set described by title 805.

In some embodiments, collaborative conference presentation interface may comprise one or more titles of the topic object of each of the topic objects associated with the participating user identifier and transmitted to the participating client device for display. By way of non-limiting example, such a collaborative conference presentation interface may be shown as interface 900 of FIG. 9, which may comprise a rendered listing of agenda objects 910 returned by the query of the shared dynamic collaborative presentation progression interface repository. In some embodiments, each agenda object (e.g., topic object sequence set) of the rendered listing of agenda objects may comprise the title of the topic object sequence set, such as that shown by non-limiting example as element 915 which reads, "Ivy Technology Demo." In some embodiments, a new agenda may be added to the agenda objects of the rendered listing of agenda objects by a selectable element of the interface, such as element 920 of interface 920. By way of non-limiting example, when a user selects (e.g., clicks) element 920 to generate a new agenda, the participating client device's interface may be configured to show interface 800 of FIG. 8 for a user to input one or more text objects to disclose the one or more topic objects, topic object sequence set description (e.g., such as a summary), and/or a title associated with the topic object sequence set.

In some embodiments, each of the agenda objects returned by the query may be configured to be selectable. By way of non-limiting example, the shared dynamic collaborative presentation progression interface server 210 may configure the GUI of a participating client device such that the client devices shows an interface (e.g., a collaborative conference presentation interface) comprising one or more agenda objects associated with the participating user identifier. Such agenda objects rendered on the configured GUI may comprise capabilities for user selection (e.g., a user may electronically request to access an agenda, topic object sequence set, of the agenda identifiers). Once selected by a user, the participating client device may transmit an agenda object selection request to the shared dynamic collaborative presentation progression interface server 210 to identify an agenda object selection request.

As shown in operation 720, the apparatus (e.g., shared dynamic collaborative presentation progression interface server 210) includes means, such as processor 202, input/output circuitry 203, communications circuitry 204, and/or the like, for identifying an agenda object selection request. By way of non-limiting example, the agenda object selection request may comprise data indicative of a user's selection of a particular agenda object to be presented in an audio-video conference presentation. In some embodiments, the agenda object selection request comprises an agenda object identifier. In some embodiments, once the shared dynamic collaborative presentation progression interface server 210 has received the agenda object selection request from a participating client device, the shared dynamic collaborative presentation progression interface server 210 may further identify and/or collect an agenda object identifier transmitted with the agenda object selection request.

As shown in operation 725, the apparatus (e.g., shared dynamic collaborative presentation progression interface server 210) includes means, such as processor 202, input/output circuitry 203, communications circuitry 204, and/or the like, for retrieving the topic object sequence set based on the agenda object identifier from the repository. In some embodiments, the agenda object identifier may comprise computer code identifying a specific topic object sequence set stored within a shared dynamic collaborative presentation progression interface repository 215 in communication with the shared dynamic collaborative presentation progression interface server 210. For example, the shared dynamic collaborative presentation progression interface server 210 may query the shared dynamic collaborative presentation progression interface repository 215, based upon the agenda object identifier, to identify and receive the topic object sequence set of the associated agenda object identifier from the shared dynamic collaborative presentation progression interface repository 215. In some embodiments, the topic object sequence set may comprise any of a plurality of elements herein described (e.g., a first topic object, one or more user identifiers assigned to each of the topic objects, one or more target times associated with one or more topics objects, etc.).

FIGS. 4A, 4B, 5, 6, and 7 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the shared dynamic collaborative presentation progression interface server 210 and executed by a processor 202 of the shared dynamic collaborative presentation progression interface server 210. As will be appreciated, any such computer program instructions may be loaded onto a computer or other programmable apparatus (e.g., hardware) to produce a machine, such that the resulting computer or other programmable apparatus implements various functions, including those functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to manage a shared dynamic collaborative presentation progression interface in association with an audio-video conferencing interface service, the apparatus comprising at least one processor and at least one memory, the at least one memory having computer-coded instructions therein, wherein the computer-coded instructions are configured to, in execution with the at least one processor, cause the apparatus to:
   monitor an active audio-video conference presentation that is configured for rendering to respective displays of a plurality of participating client devices by the audio-video conferencing interface service;
   generate a shared dynamic collaborative presentation progression interface, wherein the shared dynamic collaborative presentation progression interface is associated with a topic object sequence set, the shared dynamic collaborative presentation progression interface comprising a visual representation of the topic object sequence set and wherein the shared dynamic collaborative presentation progression interface is configured for rendering to the respective displays of the plurality of participating client devices in association with the active audio-video conference presentation;
   transmit the shared dynamic collaborative presentation progression interface to the plurality of participating client devices;
   receive an initiate topic object sequence set event from at least one participating client device of the plurality of participating client devices;
   in response to receiving the initiate topic object sequence set event, identify a first topic object of the topic object sequence set as an active topic object; and
   update the shared dynamic collaborative presentation progression interface to cause rendering of at least an active visual emphasis element in association with a visual representation of the first topic object, and wherein the visual representation of the first topic object comprises an identification of the first topic object, wherein the active visual emphasis element visually identifies the first topic object as the active topic object as compared to a visual representation of one or more non-active topic objects of the topic object sequence set concurrently rendered to the updated shared dynamic collaborative presentation progression interface.

2. The apparatus of claim 1, wherein the updated shared dynamic collaborative presentation progression interface further comprises a visual representation of an elapsed time object displayed in association with the first topic object.

3. The apparatus of claim 2, wherein the elapsed time object corresponds to a timer activated by the apparatus in association with identifying the first topic object as the active topic object.

4. The apparatus of claim 2, wherein the computer-coded instructions are further configured to, in execution with the at least one processor, cause the apparatus to:
   receive a topic object progression event from at least one participating client device of the plurality of participating client devices;
   de-identify the first topic object as the active topic object;
   identify a second topic object in the topic object sequence set as the active topic object;
   generate a transition topic object sequence instructions set based on the topic object progression event; and
   output the transition topic object sequence instructions set to the plurality of participating client devices for updating the shared dynamic collaborative presentation progression interface, wherein updating the shared dynamic collaborative presentation progression interface comprises causing:
      stopping of the rendering of the active visual emphasis element in association with the visual representation of the first topic object; and
      rendering of the active visual emphasis element in association with the visual representation of the second topic object.

5. The apparatus of claim 4, wherein de-identifying the first topic object as the active topic object comprises:
   dissociating an active topic object identifier from the first topic object;
   associating the first topic object with a completed topic object identifier; and storing the elapsed time object coinciding with the receipt of the topic object progression event in association with the completed first topic object.

6. The apparatus of claim 4, wherein the computer-coded instructions are further configured to, in execution with the at least one processor, cause the apparatus to:
in association with causing stopping of the rendering of the active visual emphasis element with respect to the visual representation of the first topic object, cause display of a completion indicator in association with the visual representation of the first topic object.

7. The apparatus of claim 4, wherein identifying the second topic object in the topic object sequence set as the active topic object comprises associating the second topic object with an active topic object identifier.

8. The apparatus of claim 4, wherein a first participating user identifier is associated with the first topic object and a second participating user identifier is associated with the second topic object and wherein the computer-coded instructions are further configured to, in execution with the at least one processor, cause the apparatus to:
display a visual representation of the first participating user identifier in association with the visual representation of the first topic object; and
display a visual representation of the second participating user identifier in association with the visual representation of the second topic object.

9. The apparatus of claim 8, wherein the computer-coded instructions are further configured to, in execution with the at least one processor, cause the apparatus to:
in response to identifying the first topic object of the topic object sequence set as the active topic object, transmit a display upcoming presenter notification event to a participating client device associated with the second participating user identifier.

10. The apparatus of claim 1, wherein a plurality of participating user identifiers are associated with the first topic object and wherein the computer-coded instructions are further configured to, in execution with the at least one processor, cause the apparatus to:
in response to receiving an identify random presentation order event, identify a first participating user identifier of the plurality of participating user identifiers associated with the first topic object;
cause display of a visual representation of the first participating user identifier in association with the visual representation of the first topic object;
determine a presenting order of the remaining participating user identifiers associated with the first topic object; and
cause display of visual representations of each of the remaining participating user identifiers in the determined presenting order in association with an upcoming presenter interface element in the visual representation of the first topic object.

11. The apparatus of claim 1, wherein the active audio-video conference presentation is associated with a presentation identifier and the topic object sequence set is associated with the presentation identifier.

12. The apparatus of claim 1, wherein the computer-coded instructions are further configured to, in execution with the at least one processor, cause the apparatus to:
receive a display collaborative conference presentation interface request, wherein the display collaborative conference presentation interface request comprises a participating user identifier;
query a repository for agenda objects associated with the participating user identifier;
cause display of a collaborative conference presentation interface to a participating client device associated with the participating user identifier in association with the active audio-video conference presentation, wherein the collaborative conference presentation interface comprises a rendered listing of agenda objects returned by the query and wherein each of the agenda objects is configured to be selectable;
identify an agenda object selection request, wherein the agenda object selection request comprises an agenda object identifier; and
retrieve the topic object sequence set based on the agenda object identifier from the repository.

13. The apparatus of claim 1, wherein the shared dynamic collaborative presentation progression interface comprises a visual representation of the topic object sequence set.

14. The apparatus of claim 13, wherein each topic object of the topic object sequence set is associated with a respective target time and the computer-coded instructions are further configured to, in execution with the at least one processor, cause the apparatus to:
display a visual representation of the respective target time in association with each topic object that is not associated with a completed topic object identifier or an active topic object identifier.

15. The apparatus of claim 14, wherein the computer-coded instructions are further configured to, in execution with the at least one processor, cause the apparatus to:
determine an elapsed time for each completed topic object, wherein each completed topic object is a topic object associated with a respective completed topic object identifier;
display a visual representation of the respective elapsed time in association with each completed topic object;
determine a visual emphasis element for each completed topic object based at least in part on the respective target time, wherein each visual emphasis element employs a contextually relevant coloring scheme to visually indicate a comparison of the elapsed time for the completed topic object to the respective target time of each completed topic object; and
apply the determined visual emphasis elements to the visual representations of the respective elapsed time in association with each completed topic object.

16. The apparatus of claim 1, wherein the active visual emphasis element in association with the visual representation of the first topic object is positioned proximate to the visual representation of the one or more non-active topic objects in the shared dynamic collaborative presentation progression interface.

17. The apparatus of claim 1, wherein the visual representation of the one or more non-active topic objects is depicted as a summary listing of the one or more non-active topic objects, the visual representation of the one or more non-active topic objects positioned proximate to the visual representation of the first topic object in the shared dynamic collaborative presentation progression interface.

18. The apparatus of claim 1, wherein the rendering of the active audio-video conference presentation is rendered concurrently with the shared dynamic collaborative presentation progression interface to the respective displays of the plurality of participating client devices.

19. A computer-implemented method for managing a shared dynamic presentation progression interface in association with an audio-video conferencing interface service, the computer-implemented method comprising:

monitoring an active audio-video conference presentation that is configured for rendering to respective displays of a plurality of participating client devices by the audio-video conferencing interface service;

generating a shared dynamic collaborative presentation progression interface, wherein the shared dynamic collaborative presentation progression interface is associated with a topic object sequence set, the shared dynamic collaborative presentation progression interface comprising a visual representation of the topic object sequence set and wherein the shared dynamic collaborative presentation progression interface is configured for rendering to the respective displays of the plurality of participating client devices in association with the active audio-video conference presentation;

transmitting the shared dynamic collaborative presentation progression interface to the plurality of participating client devices;

receiving an initiate topic object sequence set event from at least one participating client device of the plurality of participating client devices;

in response to receiving the initiate topic object sequence set event, identify a first topic object of the topic object sequence set as an active topic object; and updating the shared dynamic collaborative presentation progression interface to cause rendering of at least an active visual emphasis element in association with a visual representation of the first topic object, wherein the visual representation of the first topic object comprises an identification of the first topic object, and wherein the active visual emphasis element visually identifies the first topic object as the active topic object as compared to a visual representation of one or more non-active topic objects of the topic object sequence set concurrently rendered to the updated shared dynamic collaborative presentation progression interface.

20. The computer-implemented method of claim 19, further comprising:
displaying, on a visual representation associated of the shared dynamic collaborative presentation progression interface, an elapsed time object in association with the first topic object.

21. The computer-implemented method of claim 20, further comprising:
receiving a topic object progression event from at least one participating client device of the plurality of participating client devices;
de-identifying the first topic object as the active topic object;
identifying a second topic object in the topic object sequence set as the active topic object;
generating a transition topic object sequence instructions set based on the topic object progression event; and
outputting the transition topic object sequence instructions set to the plurality of participating client devices for updating the shared dynamic collaborative presentation progression interface, wherein updating the shared dynamic collaborative presentation progression interface comprises causing:
stopping of the rendering of the active visual emphasis element in association with the visual representation of the first topic object; and
rendering of the active visual emphasis element in association with the visual representation of the second topic object.

22. The computer-implemented method of claim 21, wherein de-identifying the first topic object as the active topic object comprises:
dissociating an active topic object identifier from the first topic object;
associating the first topic object with a completed topic object identifier; and
storing the elapsed time object coinciding with the receipt of the topic object progression event in association with the completed first topic object.

23. The computer-implemented method of claim 21, further comprising:
causing, in association with causing stopping of the rendering of the active visual emphasis element with respect to the visual representation of the first topic object, display of a completion indicator in association with the visual representation of the first topic object.

24. The computer-implemented method of claim 21, further comprising:
identifying the second topic object in the topic object sequence set as the active topic object comprises associating the second topic object with an active topic object identifier.

25. The computer-implemented method of claim 21, further comprising:
displaying a visual representation of a first participating user identifier in association with the visual representation of the first topic object; and
displaying a visual representation of a second participating user identifier in association with the visual representation of the second topic object.

26. The computer-implemented method of claim 25, further comprising:
transmitting, in response to identifying the first topic object of the topic object sequence set as the active topic object, a display upcoming presenter notification event to a participating client device associated with the second participating user identifier.

27. The computer-implemented method of claim 19, further comprising:
identifying, in response to receiving an identify random presentation order event, a first participating user identifier of a plurality of participating user identifiers associated with the first topic object;
causing display of a visual representation of the first participating user identifier in association with the visual representation of the first topic object;
determining a presenting order of the remaining participating user identifiers associated with the first topic object; and
causing display of visual representations of each of the remaining participating user identifiers in the determined presenting order in association with an upcoming presenter interface element in the visual representation of the first topic object.

28. The computer-implemented method of claim 19, further comprising:
receiving a display collaborative conference presentation interface request, wherein the display collaborative conference presentation interface request comprises a participating user identifier;
querying a repository for agenda objects associated with the participating user identifier;
causing display of a collaborative conference presentation interface to a participating client device associated with the participating user identifier in association with the active audio-video conference presentation, wherein the collaborative conference presentation interface comprises a rendered listing of agenda objects returned by the query and wherein each of the agenda objects is configured to be selectable;

identifying an agenda object selection request, wherein the agenda object selection request comprises an agenda object identifier; and retrieving the topic object sequence set based on the agenda object identifier from the repository.

29. The computer-implemented method of claim 19, further comprising:

displaying a visual representation of the respective target time in association with each topic object that is not associated with a completed topic object identifier or an active topic object identifier.

30. The computer-implemented method of claim 29, further comprising:

determining an elapsed time for each completed topic object, wherein each completed topic object is a topic object associated with a respective completed topic object identifier;

displaying a visual representation of the respective elapsed time in association with each completed topic object;

determining a visual emphasis element for each completed topic object based at least in part on the respective target time, wherein each visual emphasis element employs a contextually relevant coloring scheme to visually indicate a comparison of the elapsed time for the completed topic object to the respective target time of each completed topic object; and applying the determined visual emphasis elements to the visual representations of the respective elapsed time in association with each completed topic object.

31. A computer-program product comprising at least one non-transitory computer-readable storage medium having computer-readable program code thereon that, in execution with at least one process, configures the computer-program product for:

monitoring an active audio-video conference presentation that is configured for rendering to respective displays of a plurality of participating client devices by an audio-video conferencing interface service;

generating a shared dynamic collaborative presentation progression interface, wherein the shared dynamic collaborative presentation progression interface is associated with a topic object sequence set, the shared dynamic collaborative presentation progression interface comprising a visual representation of the topic object sequence set and wherein the shared dynamic collaborative presentation progression interface is configured for rendering to the respective displays of the plurality of participating client devices in association with the active audio-video conference presentation;

transmitting the shared dynamic collaborative presentation progression interface to the plurality of participating client devices;

receiving an initiate topic object sequence set event from at least one participating client device of the plurality of participating client devices;

in response to receiving the initiate topic object sequence set event, identify a first topic object of the topic object sequence set as an active topic object; and updating the shared dynamic collaborative presentation progression interface to cause rendering of at least an active visual emphasis element in association with a visual representation of the first topic object, wherein the visual representation of the first topic object comprises an identification of the first topic object, and wherein the active visual emphasis element visually identifies the first topic object as the active topic object as compared to a visual representation of one or more non-active topic objects of the topic object sequence set concurrently rendered to the updated shared dynamic collaborative presentation progression interface.

* * * * *